US006136272A

United States Patent [19]

Weigl et al.

[11] Patent Number: 6,136,272

[45] **Date of Patent: *Oct. 24, 2000**

[54] DEVICE FOR RAPIDLY JOINING AND SPLITTING FLUID LAYERS

[75] Inventors: Bernhard Weigl; Diane M. Zebert, both of Seattle; Margaret A. Kenny, Edmonds, all of Wash.

[73] Assignee: University of Washington, Seattle, Wash.

[ * ] Notice: This patent issued on a continued prosecution application filed under 37 CFR 1.53(d), and is subject to the twenty year patent term provisions of 35 U.S.C. 154(a)(2).

[21] Appl. No.: 08/938,584

[22] Filed: Sep. 26, 1997

[51] Int. Cl.[7] .................................................... G01N 21/64

[52] U.S. Cl. ...................... 422/82.05; 210/634; 210/511; 436/178; 356/246

[58] Field of Search ............................ 422/58, 81, 82.05; 436/178; 210/634, 511; 356/246

[56] References Cited

U.S. PATENT DOCUMENTS

| | | | |
|---|---|---|---|
| 4,894,146 | 1/1990 | Giddings | 209/12 |
| 4,983,038 | 1/1991 | Ohki et al. | 356/246 |
| 5,250,263 | 10/1993 | Manz | 422/81 |
| 5,376,252 | 12/1994 | Ekström et al. | 204/299 R |
| 5,500,071 | 3/1996 | Kaltenbach et al. | 156/272.8 |
| 5,540,888 | 7/1996 | Bunce et al. | 422/100 |
| 5,599,503 | 2/1997 | Manz et al. | 422/82.05 |
| 5,707,799 | 1/1998 | Hansmann et al. | 435/6 |

FOREIGN PATENT DOCUMENTS

| | | |
|---|---|---|
| 0 071 454 B1 | 12/1986 | European Pat. Off. . |
| WO96/12541 | 5/1996 | WIPO . |
| WO96/15576 | 5/1996 | WIPO . |
| WO97/00125 | 1/1997 | WIPO . |

OTHER PUBLICATIONS

Elwenspoek, M. et al. (1994), "Towards integrated microliquid handling systems," J. Micromech. Microeng. 4:227–243.

*Primary Examiner*—Jeffrey Snay
*Attorney, Agent, or Firm*—Greenlee, Winner and Sullivan, P.C.

[57] ABSTRACT

A device and method for introducing a second laminar fluid layer to, or removing a second laminar fluid layer from, a first laminar fluid layer are provided. Each laminar fluid layer can contain two or more side by side laminar streams. The device includes a main flow channel, and at least one tributary channel in fluid connection with a bridge channel which is in fluid connection with main flow channel. The device can be formed in a single piece of material, which can be optically transparent. Optionally, the channels can be formed in a first plate, the first and optionally the second surfaces of which are sealed to a second and optionally a third plate. The second and third plates can be optically transparent to allow for optical detection and analysis. A first laminar fluid layer is introduced into the main flow channel. If a second laminar fluid layer is to be added to the first laminar fluid layer, then the former is introduced into the tributary channel, from whence it flows into the bridge channel and then into the main flow channel, where it flows below the first laminar fluid layer and diffusionally mixes with it. Preferably, the width of the main flow channel is relatively small, so that particles in an added second laminar fluid layer diffusionally mix into the first laminar fluid layer rapidly. If a second laminar fluid layer is to be removed from a first laminar fluid layer, then the latter is split into two portions: one portion continues flowing down the main flow channel and one portion flows into the bridge channel from whence it flows into the tributary channel.

34 Claims, 22 Drawing Sheets

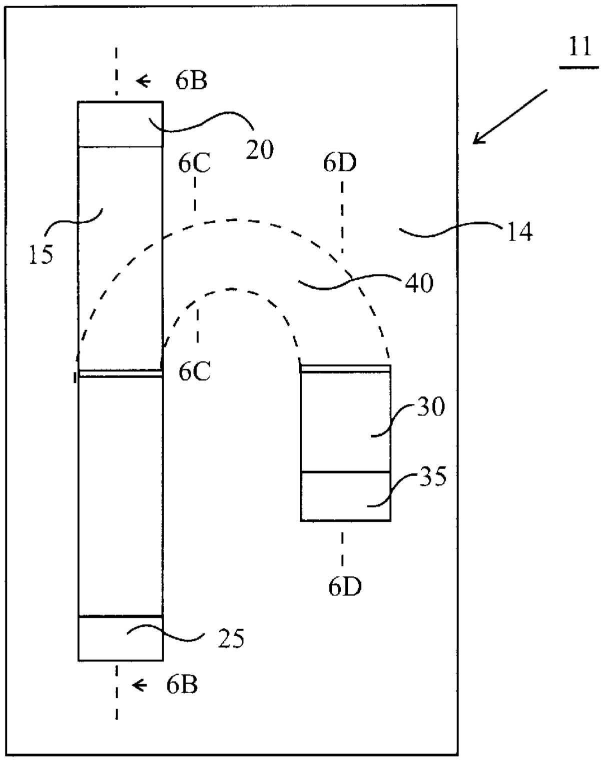
FIG. 6A
FIG. 6B
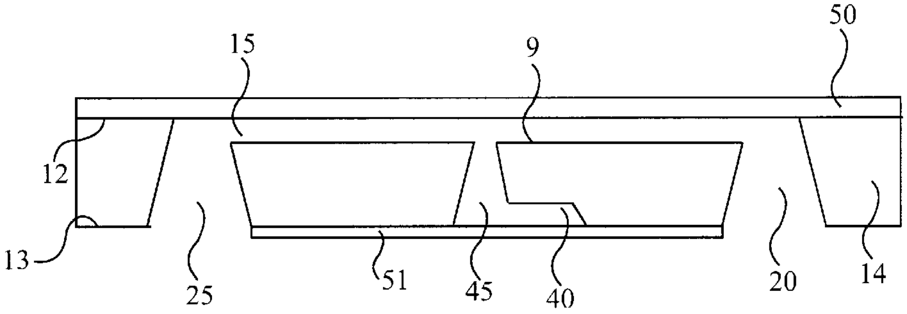
FIG. 6C
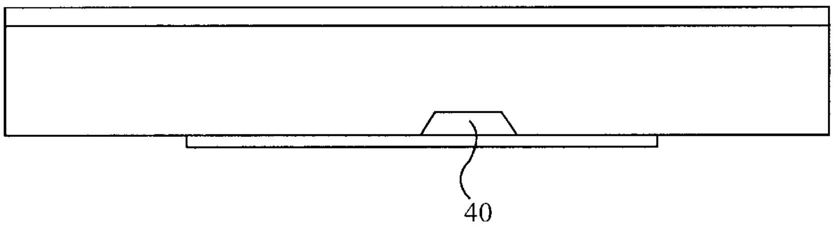
FIG. 6D
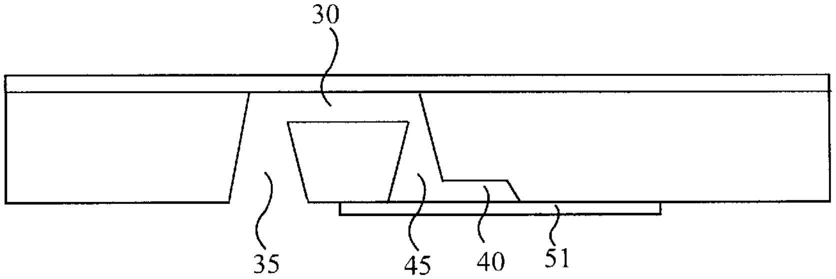

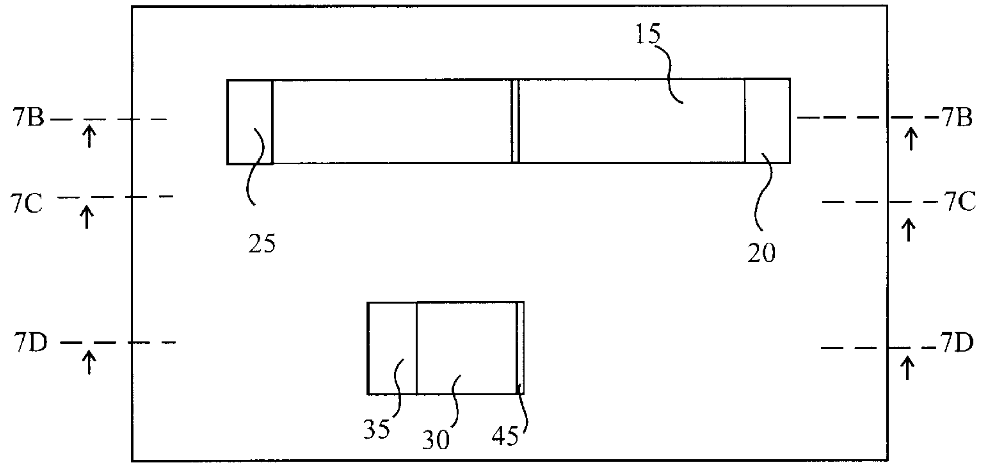
FIG. 7A
FIG. 7B
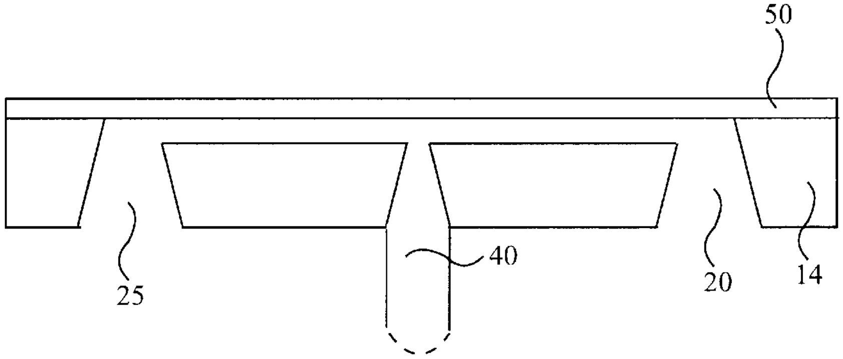
FIG. 7C
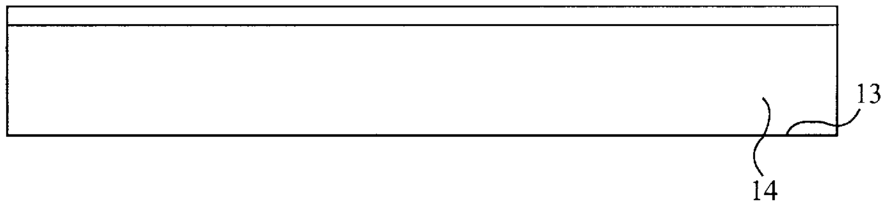
FIG. 7D
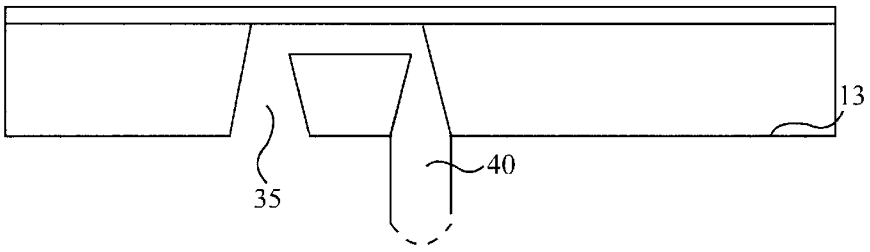

DEVICE FOR RAPIDLY JOINING AND SPLITTING FLUID LAYERS

This invention was made with Government support under research contract DAMD 17-94-J-4460 awarded by the U.S. Army. The government has certain rights in the invention.

This invention was funded at least in part by the U.S. government which may have certain rights herein.

BACKGROUND OF THE INVENTION

Devices and methods for mixing fluids, particularly for rapid mixing of fluids, are employed in many research areas and applications, including the fields of chemistry, e.g. synthetic, analytic and mechanistic research, and in medical/clinical diagnostic procedures. Devices and methods which work on the macroscale accomplish mixing by turbulence, e.g., magnetic stirring bars, electrically powered shakers, and stopped-flow spectroscopy. These devices use moving parts or very high flow rates, for example, to create turbulence, which causes mixing. Devices and methods which work on the microscale, i.e. at low Reynolds number, accomplish mixing by diffusion. At low Reynolds number, e.g. Reynolds number of about one or less, turbulence is negligible and diffusion is the only significant means of mixing. The speed of mixing by diffusion depends on the diffusion coefficients of the particles to be mixed and on the concentration of the particles. In general, the larger the particle and/or the lower the concentration, the longer it will take for mixing to occur.

Devices which use turbulence to effect mixing include static mixers. Static mixers effect mixing by stationary components that deflect substances flowing through a conduit containing the stationary components. For example, European Patent No. EP 0071454 describes a static mixer which employs stationary baffles to deflect the flow of substances through a passage, resulting in mixing of the substances as they flow through the passage. These devices, however, are large and use large volumes of fluids. Because of the baffles or analogous components necessary to effect mixing, it is impossible to form small static mixers which operate at flow speeds in the range of 100 picoliters/second to 10 milliliters/second. They cannot be scaled down to the size of microscale devices which allow for laminar conditions because under laminar flow conditions there is no mixing besides diffusion, i.e. no turbulent mixing occurs.

Microfluidic devices allow one to take advantage of diffusion as a rapid separation mechanism. Flow behavior in microstructures differs significantly from that in the macroscopic world. Due to extremely small inertial forces in such structures, practically all flow in microstructures is laminar. This allows the movement of different layers of fluid and particles next to each other in a channel without any mixing other than diffusion. On the other hand, due to the small widths and depths in such channels, diffusion is a powerful tool to separate molecules and small particles according to their diffusion coefficients, which is usually a function of their size.

Devices which employ diffusion as a means of effecting mixing, in general, have the disadvantage that the rate of mixing is dependent on the rate of diffusion of the substances being mixed and therefore effect mixing at a much slower rate than do devices employing turbulence. Some devices which employ diffusion as a means of mixing are designed to increase the rate of diffusion (and therefore also the rate of mixing) by splitting fluid streams to be mixed into several smaller streams. These smaller streams are then rotated relative to one another, thereby increasing the surface area of contact among the streams and decreasing the distances which the substances must diffuse. The streams are then channeled back together.

PCT publication WO 97/00125 discloses a flow cell for mixing by diffusion which divides each of two or more input streams into a plurality of thin streams and then channels the thin streams into a planar flow bed such that adjacent thin streams which are in contact with each other are from different input streams. Thus, there is an increased surface area of contact between the input streams, a reduced distance for diffusion, and hence a reduced time for mixing under laminar conditions. This device, however, appears to provide for mixing in only one dimension, that is in the plane of the fluid flow, perpendicular to the direction of flow. FIG. 1 shows a generic fluid flow device 1 for the purpose of defining the three axes which represent spatial direction. Fluid flows from the inlet 5 toward the outlet 10. PCT publication WO 97/00125 teaches mixing only in the depth dimension.

BRIEF SUMMARY OF THE INVENTION

The present invention provides a device for laminating (layering) and thereby mixing two or more laminar fluid layers by introducing one laminar fluid layer across the entire breadth, herein referred to as depth, of another laminar fluid layer. FIG. 1 shows the dimensions of length, depth, and width in relation to flow direction, of a device of the present invention. Each laminar fluid layer can contain two or more side by side laminar streams. Diffusional mixing can occur among the side by side streams in the depth direction, and between the laminar fluid layers in the width direction. Because the width is small, diffusional mixing of the laminar layers occurs quickly. Diffusional mixing as used herein refers to mixing by diffusion, as opposed to turbulence.

An object of the present invention is to provide a device and method for mixing in two directions: in the depth direction, as in the PCT publication WO 97/00125, and in the width direction (see FIG. 1).

This invention further provides a device for introducing a second laminar fluid layer to, or removing a second laminar fluid layer from, a first laminar fluid layer.

An object of the present invention is to provide for diffusional mixing in two dimensions (depth and width) while maintaining the flow pattern, i.e. the side by side laminar streams of a first laminar fluid layer and the side by side laminar streams of a second fluid layer are maintained.

In addition to the diffusional mixing mode of using the device, an alternative mode for splitting fluid layers is provided. A second fluid layer is split off from (removed from) the first fluid layer. In this alternative mode also the flow pattern is preserved, i.e. the first laminar fluid layer from which a portion is removed to form a second fluid layer retains its side by side laminar streams, as does the second fluid layer.

In general, the device comprises a main laminar flow channel, a tributary channel, and a bridge channel which connects the main flow channel to the tributary channel.

In a first mode of using the device, a diffusional mixing mode, a first laminar fluid layer in the main flow channel can be mixed with a second laminar fluid layer which passes from the tributary channel, through the bridge channel and into the main flow channel where it contacts the first laminar layer.

In a second mode of using the device, a splitting mode, a first laminar fluid layer in the main flow channel can be split into two or more laminar fluid layers. A portion of the first laminar fluid layer flows out of the main flow channel, into the bridge channel, and into the tributary channel.

A device may combine the two modes, having several bridge channels, one or more bridge channels having a laminar fluid layer flowing toward the main flow channel (for mixing layers), and one or more bridge channels having a laminar fluid layer flowing out of the main flow channel (for splitting layers).

In either mode (diffusional mixing mode or splitting mode) the flow pattern of each laminar fluid layer can be preserved. Flow pattern is preserved when the bridge channel connects to the entire depth of the bottom of the main flow channel. For example, in the splitting mode, if the first laminar fluid layer contains three side by side laminar streams A, B, and C, with stream B between streams A and C, then the second laminar fluid layer (split off from the first laminar fluid layer) does also. Preservation of flow pattern as used herein means that the side by side laminar streams in a laminar fluid layer are maintained. A laminar fluid layer as used herein refers to a fluid flowing under laminar conditions which extends across the depth of the channel.

Likewise, in the diffusional mixing mode a second laminar fluid layer laminated with a first laminar fluid layer retains its flow pattern as does the first laminar fluid layer. For example, if the first laminar fluid layer contains three side by side laminar streams A, B, and C (with stream B between streams A and C) upstream of the bridge channel, then it does downstream of the bridge channel also. The flow pattern of the second laminar fluid layer is similarly preserved. When two or more layers are laminated (i.e., layered, stacked) each layer extends across the depth of the channel, but none of the layers extends across the width.

Detection, preferably, optical detection, can be performed in the main flow channel and/or the tributary channel.

The device comprises a main flow channel which has an upstream end and a downstream end. The main flow channel has a top, bottom and sides. The device can be spatially oriented in any direction. The bridge channel provides for fluid connection between the main flow channel and the tributary channel. The first end of the bridge channel connects to the bottom of the main flow channel. The second end of the bridge channel connects to the tributary channel.

The device can be made by forming channels in any substrate material which allows for such channels to be formed. For example, the device can be made in plastic, glass or silicon wafers. Substrate materials which are optically transparent for a given wavelength range allow for optical detection in that wavelength range, e.g., absorbance or fluorescence measurements, by transmission. Alternatively, substrate materials which are reflective allow for optical detection by reflection. Substrate materials do not have to allow for optical detection because other art-known methods of detection are suitable as well. For example, a non-optical detection method of detection is electrochemical detection.

The devices and methods of this invention need not include any means for detection. The present devices and methods can be used for purposes which do not require detection of the fluids flowing therein, for example, in chemical synthesis, especially synthesis of small volumes, e.g., expensive products, the syntheses of which are rote or automated. In these cases, of course, the substrate material need not be optically transparent at any wavelength range.

In one embodiment, the device is formed such that all of the channels are enclosed by the substrate material in which they are formed. All of the channels are in the interior of the substrate material. That is, none of the channels lies in the exterior top, bottom or side surfaces of the substrate material. Only the inlet and outlet ports connect with the exterior of the substrate material. In this embodiment for a substantially rectangular cross section, the term "bottom" refers to one of the sides having the larger cross sectional dimension. Optically transparent substrate materials, e.g., glass, allow for optical monitoring and detection of the fluids therein.

In a preferred embodiment, the device comprises a first plate having a first surface and a second surface. The plate has formed therein a main flow channel formed in the first surface of the first plate. The main flow channel has an upstream end and a downstream end. The main flow channel has a top, bottom and sides. The bridge channel connects to the bottom of the main flow channel. The device can be spatially oriented in any direction. The top of the main flow channel is preferably a second plate sealed to the first plate. In this embodiment, the bottom of the main flow channel is the surface of the main flow channel opposing the second plate and farthest way from the first surface of the first plate.

The channels of the present device have three dimensions: length, depth, and width. (See FIG. 1).

The length of a channel refers to the dimension in which the fluids flow therein.

The depth of the main flow channel refers to the dimension to which a bridge channel is connected, so that when a fluid layer is introduced to a first laminar fluid layer (a layer of fluid already flowing in the main flow channel), the added layer is introduced along the depth of the main flow channel, preferably across the entire depth. The term "across," as used herein means extending across the entire dimension, whereas the term "along" means not necessarily extending across the entire dimension, i.e., extending partially or entirely across the dimension. If the cross section of the channel is not rectangular, then the depth is measured at one-half the width. This design provides that along the depth dimension all portions of the added (second) laminar fluid layer contact the first layer simultaneously. Thus, this invention provides a device and method for rapidly stopping a chemical reaction, for example, by introducing a quenching reagent to the main flow channel in which a chemical reaction is occurring. Alternatively, this invention provides a device and method for rapidly starting a chemical reaction, for example, by introducing a reagent to the main flow channel in which is flowing a substance which reacts with the added reagent.

The width is the third dimension of the laminar channels of this device. If the cross section of the channel is not rectangular, then the width is measured at one-half the depth. The width of each channel is smaller than the length and is preferably smaller than the depth, to allow for faster diffusional mixing in the width direction. In the preferred embodiment, wherein the channels are formed in first and second surfaces of a first plate and second and third plates are sealed respectively thereto, the width is generally, but not necessarily, smaller than the depth. Preferably the width of the bridge channel is the same as the width of the tributary channel, so that no change in flow velocity occurs as fluids flow between the two channels. Particles in the (added) second laminar fluid layer diffuse across the width of the main flow channel into the first laminar fluid layer. The shorter the width, the less time it takes for diffusion (and mixing thereby) to occur.

The main flow channel can lie in the first surface of the plate to allow for optical monitoring of the fluids therein.

The tributary channel can also lie in the first surface of the plate to allow for optical monitoring of the fluids therein, preferably with the same detecting device used to monitor the main flow channel.

A first laminar fluid layer is introduced into the main flow channel through a first inlet port in fluid connection with the upstream end of the main flow channel.

Fluid flows from the upstream end of the main flow channel to the downstream end of the main flow channel. A first outlet port in fluid connection with the downstream end of the main flow channel provides for removal of fluid from the main flow channel.

At least one bridge channel, each of which has a first end and a second end, is preferably formed in the plate in a plane other than the first plane and joins the main flow channel between the upstream end of the main flow channel and the downstream end. For some manufacturing purposes, e.g., etching in silicon wafers or glass, it is preferable that the bridge channel be formed in a plane parallel to the plane containing the main flow channel, and in particular in the second surface of the plate.

Alternatively, the bridge channel can be formed outside of the first plate. For example, the bridge channel can be made of tubing, e.g. rubberized silicon tubing, tygon or teflon tubing. A bridge channel made of tubing has the same internal width and depth as a bridge channel formed in the first plate, e.g. 50 microns×400 microns. The tubing is in fluid connection and sealed to through-holes in the first plate.

The first end of the bridge channel is in fluid connection with the main flow channel via a first through-hole which passes through the first and second surfaces of the plate. It is preferable that the first end of the bridge channel be in fluid connection with the entire depth, as opposed to only a portion thereof, of the main flow channel.

The second end of the bridge channel is in fluid connection with a first end of a tributary channel via a second through-hole which passes through the entire width of the plate. A tributary port in fluid connection with the second end of the tributary channel provides for introduction or removal of a second fluid layer into or out of, respectively, the tributary channel. The tributary channel can be formed in the first surface of the plate to allow for optical monitoring of the fluids therein, and particularly optical monitoring of the fluids in both the tributary channel and the main flow channel by one device, e.g., one camera.

Alternatively, the tributary channel can be formed in the second surface of the plate, and in fluid connection with the main flow channel via a bridge channel which connects the tributary channel to the main flow channel which is in the first surface of the plate. In this embodiment, the bridge channel consists of a through-hole. The bridge channel provides the only fluid connection between the main flow channel and the tributary channel.

A second plate, preferably optically transparent, can be sealed to the first surface of the first plate, or to some portion thereof including the portion in which the main flow channel and optionally the tributary channel are formed. Optical monitoring of the fluids in the main flow channel and tributary channel may be desirable. A third plate, optionally optically transparent to allow for detection by transmission, can be sealed to the second surface of the first plate or to some portion thereof, including the portion through which the bridge channel passes in embodiments wherein the bridge channel is formed in the first plate. The inlet ports and outlet ports should not be covered so that fluids can be introduced and/or removed at these positions.

Depending on whether there is positive pressure from the tributary channel, e.g., a second laminar fluid layer in the tributary channel, the first laminar fluid layer is either split into two laminar fluid layers (in the case of no positive pressure from the tributary channel), or it is joined with a second laminar fluid layer entering from the tributary channel.

In the diffusional mixing mode, a second laminar fluid layer containing a single stream or containing two or more side by side streams can be joined with a first laminar fluid layer containing a single stream or containing two or more side by side streams. Thus, there can be a 1+1, 2+1, 1+2, 2+2, 1+3, 3+1, 2 +3 . . . type addition of laminar fluid layers—the first numeral of each pair indicating the number of side by side streams in the first laminar fluid layer and the second numeral of each pair indicating the number of side by side streams in the second laminar fluid layer.

In the splitting mode, a first laminar fluid layer containing a single stream or containing two or more side by side streams can be split into a second laminar fluid layer, preferably containing the same number of side by side streams.

In cases wherein a laminar fluid layer contains two or more side by side streams, one stream can be a sample stream and the other can be an indicator stream. A sample stream is defined herein as a fluid stream containing particles of the same or different size, for example, blood or other bodily fluid, contaminated drinking water, and the like. A sample stream may contain analyte particles which can be, but need not be, capable of diffusing into an indicator stream in the device. Analyte particles are small enough to flow through the channels of the device substantially without clogging. Analyte particles include but are not limited to hydrogen, calcium and sodium ions, proteins, pesticides, fine sand, blood cells, bacteria and the like. An indicator stream is defined herein as a fluid stream containing an indicator substance, which is a substance which exhibits a detectable change in property upon contact with an analyte. If the device is used to monitor reaction of analyte particles with indicator substance, then at least one of the two must be capable of diffusing to the other. As described in U.S. patent application Ser. No. 08/625,808, "Microfabricated Diffusion-Based Chemical Sensor," now U.S. Pat. No. 5,716,852, and U.S. patent application Ser. No. 08/829,679, now U.S. Pat. No. 5,972,710, both of which are incorporated in their entirety by reference herein, small analyte particles in a sample stream diffuse into an indicator stream, causing a detectable change in property of the indicator stream. This detectable change occurs in a portion of the indicator stream referred to as an analyte detection area.

Alternatively, if a laminar fluid layer contains two or more side by side laminar streams, one stream can contain a substrate, e.g. an antigen, and the other stream(s) can contain different substrates, e.g. different antigens. A second laminar fluid layer can be added to (contacted with) the first laminar fluid layer. The second laminar fluid layer can contain a reagent, for example a given antibody that is fluorescently labeled, which reacts with only one antigen. In this example, only one of the side by side streams of the first laminar fluid layer shows a detectable change in property (e.g., fluorescence).

The device and method of this invention provide for adding a laminar fluid layer containing one stream or a plurality of side by side streams, e.g. indicators, reagents, substrates, inert solutions, carrier solutions and the like to another laminar fluid layer containing one stream or a plurality of side by side streams. A laminar fluid layer of an inert solution can be positioned between two laminar fluid layers containing particles which react with each other. An inert laminar fluid layer can serve as a buffer zone to prevent such reaction or to delay it so that such reaction occurs in a particular location in the device, for instance, to facilitate detection. A carrier laminar fluid layer is any fluid, e.g., inert solvent, capable of accepting and carrying particles for some distance through the device.

BRIEF DESCRIPTION OF THE SEVERAL VIEWS OF THE DRAWINGS

FIG. 2, comprising

FIG. 6A is a schematic representation of a flow cell device, showing the bridge channel in dotted lines as it lies below the plane of the channels.

FIG. 6B is a lengthwise cross section of FIG. 6A.

FIG. 6C is a lengthwise cross section of FIG. 6A.

FIG. 6D is a lengthwise cross section of FIG. 6A.

FIG. 7A is a schematic representation of a flow cell device wherein the bridge channel is formed of tubing.

FIG. 7B is a lengthwise cross section of FIG. 7A.

FIG. 7C is a lengthwise cross section of FIG. 7A.

FIG. 7D is a lengthwise cross section of FIG. 7A.

DETAILED DESCRIPTION OF THE INVENTION

This invention relates to the following co-pending Patent Applications, all of which are incorporated by reference in their entirety: U.S. Ser. No. 08/625,808, "Microfabricated Diffusion-Based Chemical Sensor," filed Mar. 29, 1996, now U.S. Pat. No. 5,716,852; U.S. Ser. No. 08/829,679, "Microfabricated Diffusion-Based Chemical Sensor," filed Mar. 31, 1997, now U.S. Pat. No. 5,972,710; U.S. patent application Ser. No. 08/900,926 "Simultaneous Analyte Determination and Reference Balancing in Reference T-Sensor Devices," filed Jul. 25, 1997, now U.S. Pat. No. 5,948,684; U.S. Ser. No. 08/621,170 "Fluorescent Reporter Beads for Fluid Analysis," filed Mar. 20, 1996, now U.S. Pat. No. 5,747,349; U.S. Ser. No. 08/663,916, "Microfabricated Differential Extraction Device and Method," filed Jun. 14, 1996, now U.S. Pat. No. 5,932,100; U.S. Ser. No. 08/534,515, "Silicon Microchannel Optical Flow Cytometer," filed Sep. 27, 1995, now U.S. Pat. No. 5,726,751; PCT No. 96/15566 "Silicon Microchannel Optical Flow Cytometer," filed Sep. 27, 1996; U.S. Ser. No. 08/823,747, "Device and Method For 3-Dimensional Alignment of Particles in Microfabricated Flow Channels," filed Mar. 26, 1997; U.S. Ser. No. 08/876,038, "Adsorption-Enhanced Differential Extraction Device," filed Jun. 13, 1997, now U.S. Pat. No. 5,971,158; U.S. Ser. No. 60/049,533, "Method For Determining Concentration of a Laminar Sample Stream," filed Jun. 13, 1997; U.S. Ser. No. 08/938,585, "Simultaneous Particle Detection and Chemical Reaction," filed concurrently herewith; Ser. No. 08/938,093, "Multiple Analyte Diffusion Based Chemical Sensor," filed concurrently herewith.

Figure 1:
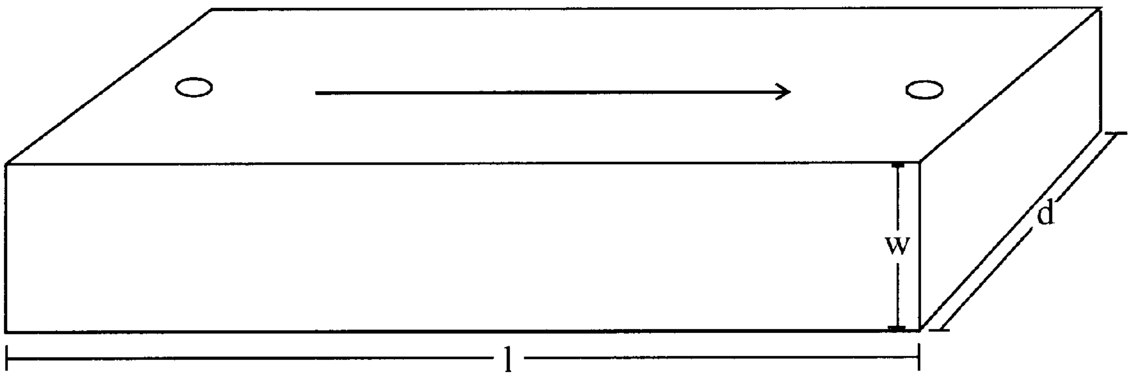
FIG. 1 is a schematic representation of a generic flow cell device, demonstrating the dimensions of length, depth and width.
Figure 2A:
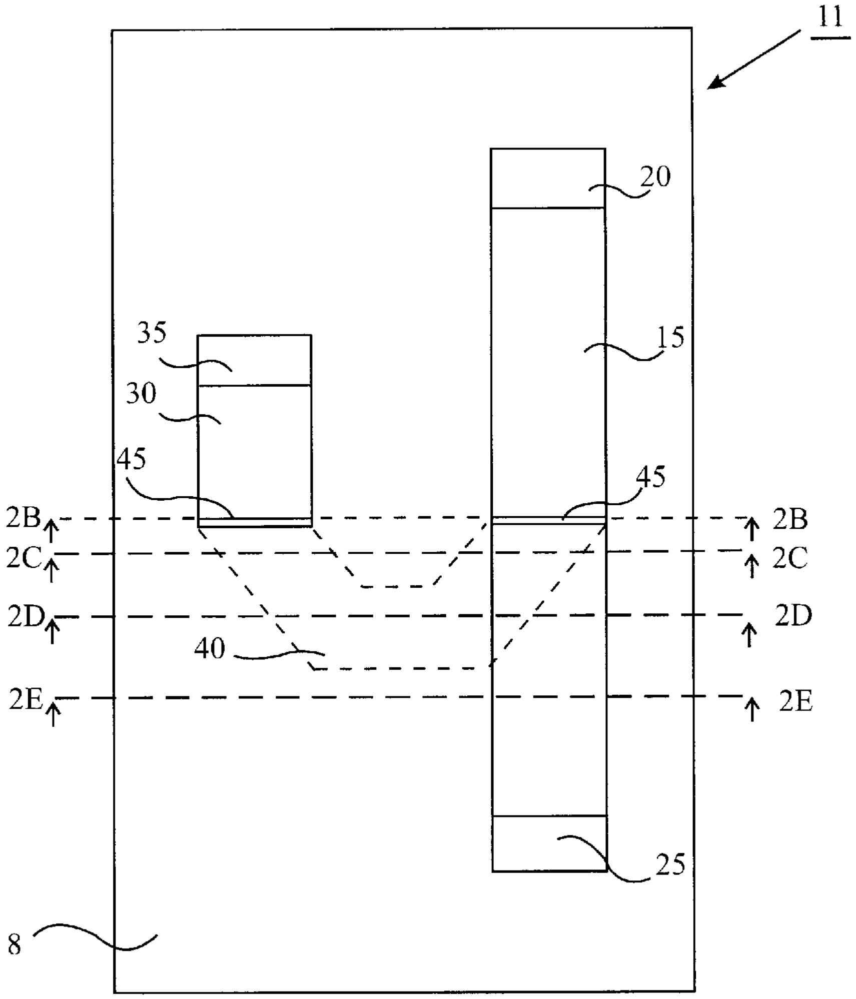
FIGS. 2A–2E, show an embodiment wherein all channels are formed in the interior of the substrate material.

FIG. 2A illustrates a flow cell device 11 of the present invention formed in a substrate 8 wherein the channels are formed in the interior of the substrate, i.e., they do not lie in the exterior surfaces. Channels can be formed in a single piece of substrate or in two pieces which are then fused together. Because this embodiment includes no cover plates, there is little to no chance of leakage.

First inlet port 20 is in fluid connection with main flow channel 15 at the upstream end of main flow channel 15. First outlet port 25 is in fluid connection with main flow channel 15 at the downstream end of main flow channel 15. Tributary port 35 is in fluid connection with tributary channel 30. Tributary channel 30 is also in fluid connection with bridge channel 40, which provides for fluid connection between main flow channel 15 and tributary channel 30 such that the flow pattern of the fluid layer in each channel is preserved. Bridge channel 40 joins the bottom of the main flow channel, and preferably the entire depth of the bottom 9 of the main flow channel. Bridge channel 40 is formed in a plane other than the plane containing main flow channel 15. Bridge channel 40 can lie in a plane below and parallel to the plane containing main flow channel 15 and preferably also tributary channel 30. Alternatively, bridge channel 40 can lie in a plane perpendicular to the plane containing main flow channel 15, e.g., in substrate materials which are quite thick, such as plastic wafers, with a width, w, great enough to provide for a perpendicular bridge channel. Alternatively, bridge channel 40 may lie in a plane askew to the plane containing main flow channel 15.

As will be understood by those of ordinary skill in the art, the materials and methods used for manufacturing the device determine the convenience of which plane contains the bridge channel and its position relative to the plane containing the main flow channel. The first end of tributary channel 30 joins the second end of bridge channel 40 via through-hole 45. The first end of bridge channel 40 joins main flow channel 15 via through-hole 45. Each of through-holes 45 passes from the plane in which main flow channel 15 and tributary channel 30 are formed (in this example 15 and 30 are in the same plane), to the plane in which bridge channel 40 is formed. Through-holes 45 can run perpendicular to the plane containing main flow channel 15 and tributary channel 30.

Figure 2B:
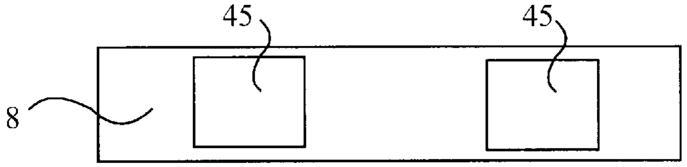

FIG. 2B is a cross sectional view of FIG. 2A showing through-holes 45.

Figure 2C:
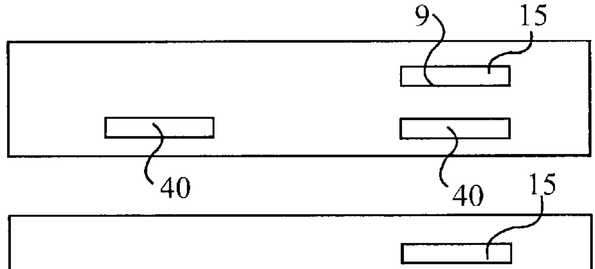

FIG. 2C is a cross sectional view of FIG. 2A showing main flow channel 15 and its bottom 9, and sections of bridge channel 40.

Figure 2D:
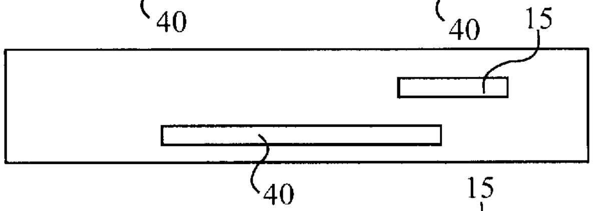

FIG. 2D is a cross sectional view of FIG. 2A showing main flow channel 15, and a section of bridge channel 40.

Figure 2E:
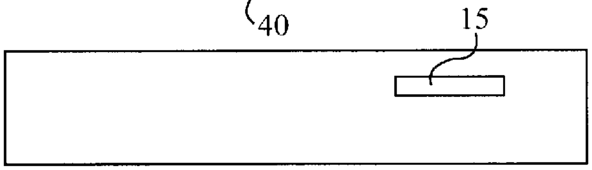

FIG. 2E is a cross sectional view of FIG. 2A showing main flow channel 15.

Alternatively, in the embodiment in FIG. 2A–2E, detection by non-optical, e.g., electrochemical, means known to the art can be performed.

Figure 3A:
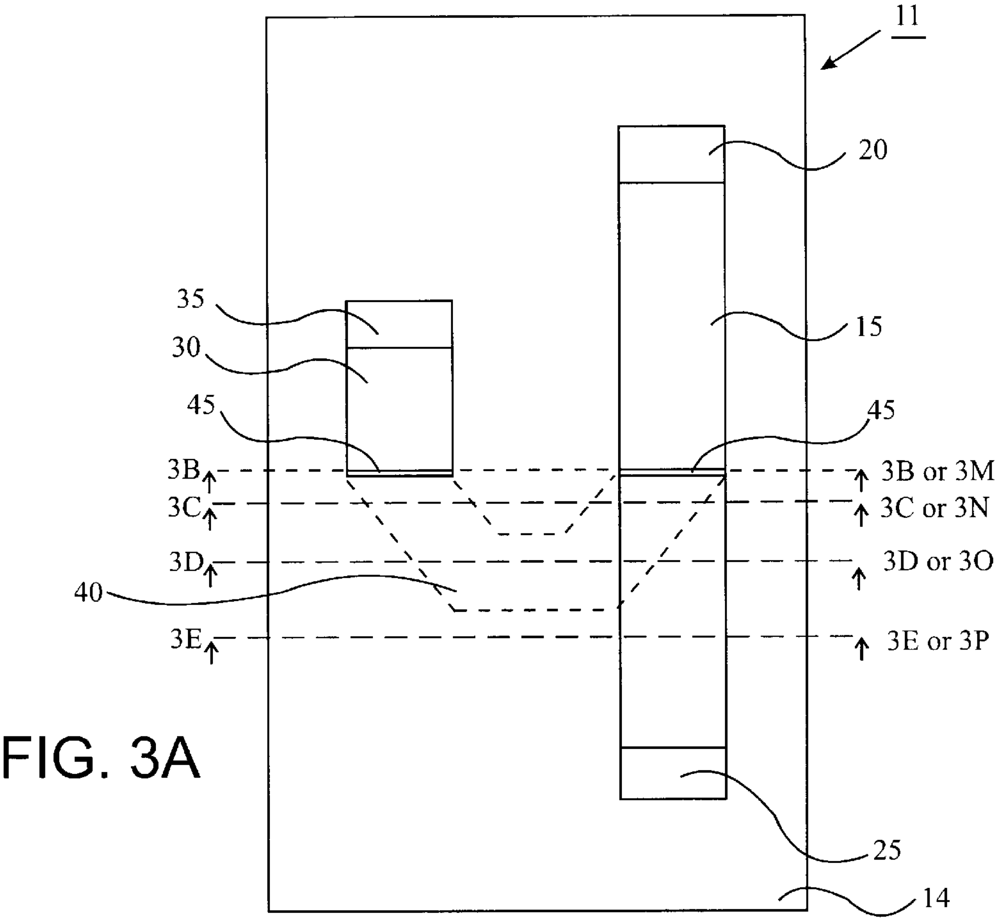
FIG. 3A is a schematic representation of a flow cell device of this invention, showing the bridge channel in dotted lines as it lies below the plane of the main flow channel and tributary channel.

FIG. 3A illustrates a flow cell device 11 of the present invention formed in first plate 14. First plate 14 has a first surface 12 and a second surface 13 in which channels are formed. Ease of manufacturing makes this embodiment preferred over other embodiments, e.g., the embodiment in FIGS. 2A–2E.

Referring again to FIG. 3A, first inlet port 20 is in fluid connection with main flow channel 15 at the upstream end of main flow channel 15. First outlet port 25 is in fluid connection with main flow channel 15 at the downstream end of main flow channel 15. Tributary port 35 is in fluid connection with tributary channel 30. Tributary channel 30 is also in fluid connection with bridge channel 40, which provides for fluid connection between main flow channel 15 and tributary channel 30 such that the flow pattern of the fluid layer in each channel is preserved. Bridge channel 40 joins the bottom of the main flow channel, and preferably the entire depth of the bottom 9 of the main flow channel. Tributary channel 30 preferably lies in the plane containing main flow channel 15, so that optical monitoring such as detection by absorbance or transmission can be performed with one detector monitoring both channels. Bridge channel 40 is formed in a plane other than the plane containing main flow channel 15. Bridge channel 40 may lie in a plane below and parallel to the plane containing main flow channel 15 and preferably also tributary channel 30. Alternatively, bridge channel 40 can lie in a plane perpendicular to the plane containing main flow channel 15, or bridge channel 40 may lie in a plane askew to the plane containing main flow channel 15.

As noted above, the materials and methods used for manufacturing the device determine the convenience of which plane contains the bridge channel and its position relative to the plane containing the main flow channel. The first end of tributary channel 30 joins the second end of bridge channel 40 at through-hole 45. The first end of bridge channel 40 joins main flow channel 15 at through-hole 45. Each of through-holes 45 passes from the first surface of the plate, in which main flow channel 15 and tributary channel 30 are formed, to the second surface of the plate, in which bridge channel 40 is formed. Through-holes 45 can run perpendicular to the plane containing main flow channel 15 and tributary channel 30.

Figure 3B:
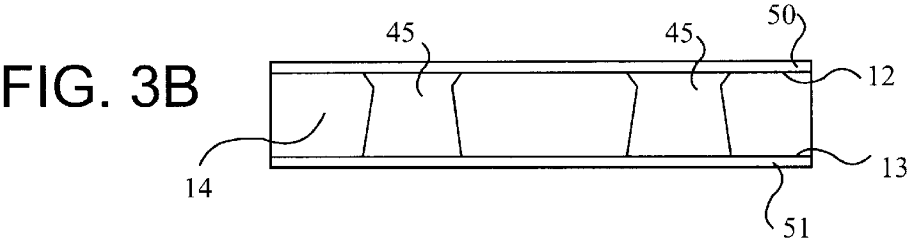
FIG. 3B is a cross section of FIG. 3A.

FIG. 3B is a cross sectional view of FIG. 3A showing through-holes 45 passing through first surface 12 of first plate 14, through first plate 14, and through second surface 13 of first plate 14. Also shown are second plate 50 sealed to first surface 12 of first plate 14, and third plate 51, sealed to second surface 13 of first plate 14. Second plate 50 and third plate 51 are cover plates, preferably optically transparent to allow for optical monitoring of the fluids contained in the flow cell.

Figure 3C:
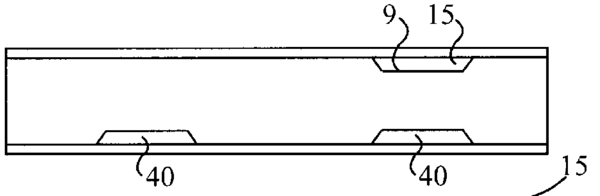
FIG. 3C is a cross section of FIG. 3A.

FIG. 3C is a cross sectional view of FIG. 3A showing main flow channel 15, and sections of bridge channel 40.

Figure 3D:
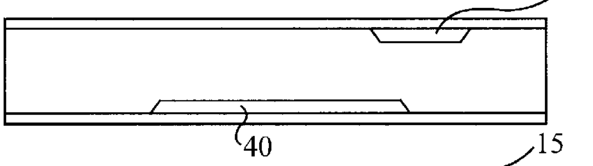
FIG. 3D is a cross section of FIG. 3A.

FIG. 3D is a cross sectional view of FIG. 3A showing main flow channel 15, and a section of bridge channel 40.

Figure 3E:
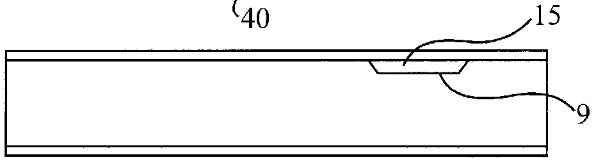
FIG. 3E is a cross section of FIG. 3A.

FIG. 3E is a cross sectional view of FIG. 3A showing main flow channel 15.

Figure 3F:
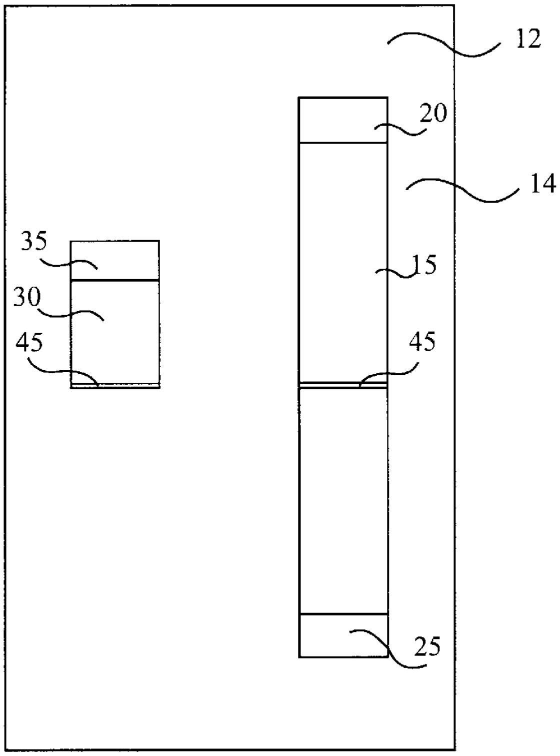
FIG. 3F is a plan view of the first surface of the device of FIG. 3A.

FIG. 3F is a plan view of the first surface 12 of first plate 14. Tributary port 35 passes through first plate 14 and is in fluid connection with tributary channel 30. Tributary channel 30 is in fluid connection with a first through-hole 45, which passes through first plate 14 to connect with the bridge channel. Also seen in FIG. 3F is first inlet port 20, which passes through first surface 12 and is in fluid connection with main flow channel 15. Main flow channel 15 is in fluid connection with a second through-hole 45, which passes through first plate 14 to connect with bridge channel 40. Main flow channel 15 extends downstream of through-hole 45 to first outlet port 25, which passes through first plate 14.

Figure 3G:
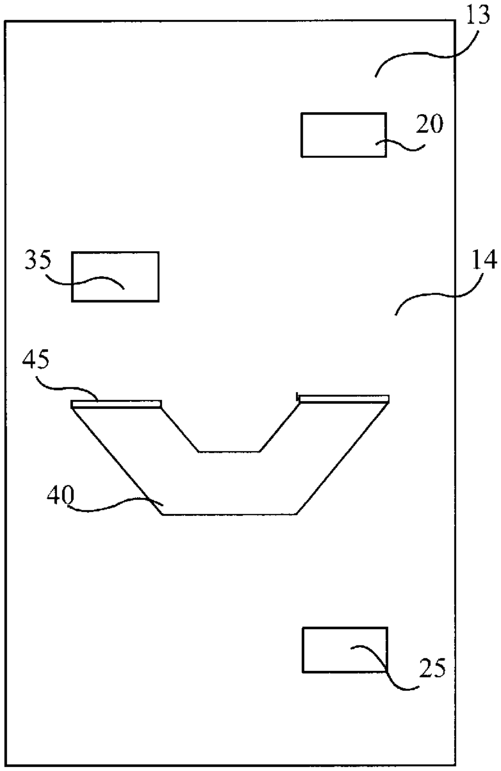
FIG. 3G is a plan view of the second surface of the device of FIG. 3A.

FIG. 3G is a plan view of the second surface 13 of first plate 14 of the flow cell device in FIG. 3A. Tributary port 35 passes through first plate 14. Bridge channel 40 is in fluid connection with through-holes 45, which passes through first plate 14. Also seen in FIG. 3G are first inlet port 20 and first outlet port 25 which pass through first plate 14.

Figure 3H:
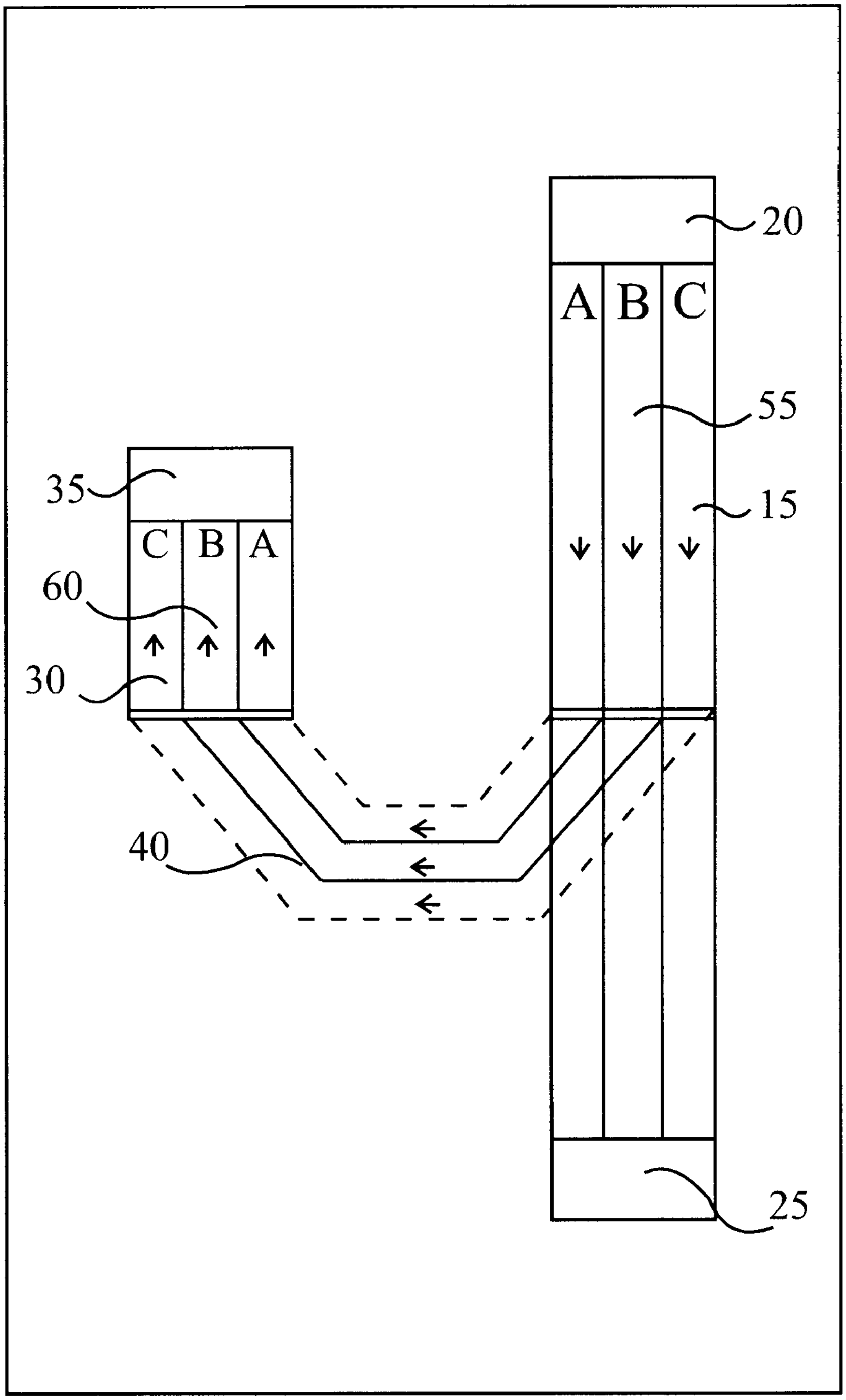
FIG. 3H shows a second laminar fluid layer being split off from a first laminar fluid layer in the device of FIG. 3A, with preservation of flow pattern.

FIG. 3H shows the device of FIG. 3A with a first laminar fluid layer 55 introduced into main flow channel 15 via first inlet port 20. First laminar fluid layer 55 flows from the upstream end of main flow channel 15 toward the downstream end of main flow channel 15.

In the splitting mode of using the device, wherein no fluid layer is introduced into tributary port 35, a layer of fluid is split off, i.e. removed, from first laminar fluid layer 55 by passing through through-hole 45 and then into bridge channel 40. This layer of first laminar fluid layer 55 which is split off is referred to hereinafter as second laminar fluid layer 60. Second laminar fluid layer 60 flows through bridge channel 40. Importantly, second laminar fluid layer 60 retains its flow pattern in bridge channel 40. For example, if first laminar fluid layer 55 contains three side by side laminar streams A, B, and C, with stream B between streams A and C, then second laminar fluid layer 60 does also, as shown in FIG. 3H. Second laminar fluid layer 60 flows from bridge channel 40 into tributary channel 30 via through-hole 45. Second laminar fluid layer 60 can be optically monitored in tributary channel 30. Second laminar fluid layer 60 exits tributary channel 30 via tributary port 35.

Figure 3I:
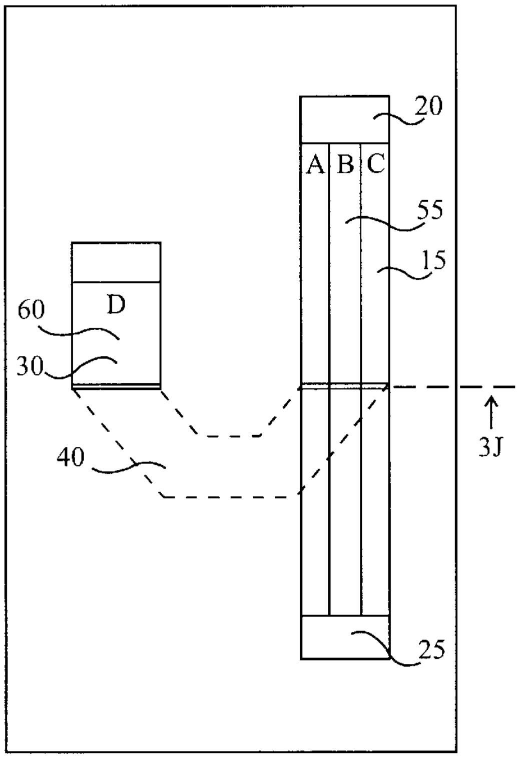
FIG. 3I shows a second laminar fluid layer being joined with a first laminar fluid layer in the device of FIG. 3A, with preservation of flow pattern.
Figure 3K:
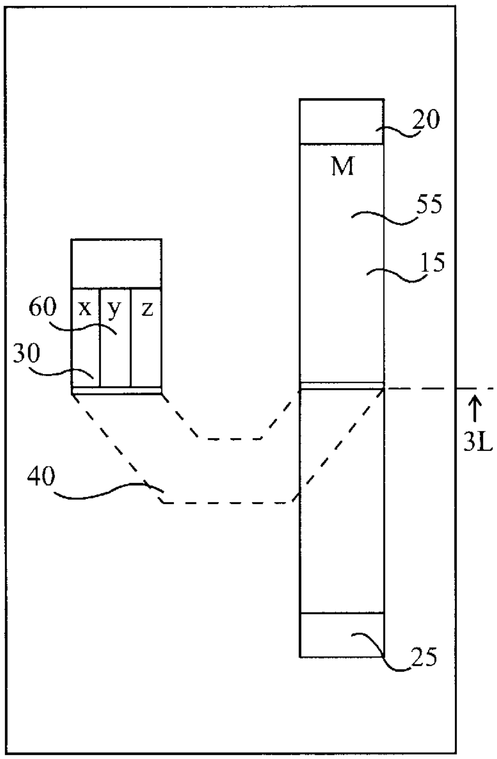
FIG. 3K shows a second laminar fluid layer being joined with a first laminar fluid layer in the device of FIG. 3A, with preservation of flow pattern.
Figure 3J:
FIG. 3J shows a cross section of the laminar flow in FIG. 3I immediately downstream of the bridge channel.

Alternatively, in the diffusional mixing mode of using the device, wherein a fluid is introduced into tributary port 35, a second laminar fluid layer 60 is added to first laminar fluid layer 55, as shown in FIGS. 3I and 3K. As in the splitting mode, a first laminar fluid layer 55 is introduced into main flow channel 15 via first inlet port 20. First laminar fluid layer 55 flows from the upstream end of main flow channel 15 toward the downstream end of main flow channel 15. A second laminar fluid layer 60 is introduced into tributary channel 30 via tributary port 35. Second laminar fluid layer 60 flows through tributary channel 30 and into bridge channel 40 via a first through-hole 45. Second laminar fluid layer 60 flows through bridge channel 40 into main flow channel 15 via a second through-hole 45 where it contacts first laminar fluid layer 55. Second laminar fluid layer 60 and first laminar fluid layer 55 flow in laminar fashion down main flow channel 15 toward first outlet port 25, during which time particles in first laminar fluid layer 55 diffuse into second laminar fluid layer 60 and particles in second laminar fluid layer 60 diffuse into first laminar fluid layer 55. This diffusion occurs in the width direction. Because the width is small, e.g. 50 microns, diffusion and therefore mixing by diffusion occurs rapidly. Optical monitoring of first laminar fluid layer 55 downstream of bridge channel 40 provides for detection of diffusional mixing of particles from second laminar fluid layer 60 and first laminar fluid layer 55. The device provides for addition of a second laminar fluid layer 60 to first laminar fluid layer 55 such that the entire depth of first laminar fluid layer 55 is contacted simultaneously by second laminar fluid layer 60 and vice versa. That is, bridge channel 40 preferably joins the entire depth of the bottom of the main flow channel, so that the entire depth of a first laminar fluid layer 55 is contacted simultaneously by a second laminar fluid layer 60. Therefore, in a case wherein second laminar fluid layer 60 contains a reagent (D) and first laminar fluid layer 55 contains three side by side laminar streams, A, B, and C, as in FIG. 3I, each of side by side laminar streams A, B, and C is contacted simultaneously with the reagent D in second laminar fluid layer 60. Reagent D begins to mix with each side by side laminar stream A, B, and C simultaneously. Assuming that the reagent has the same diffusion coefficient in each side by side laminar stream A, B, and C, then the reagent mixes into streams A, B, and C at the same rate. FIG. 3J is a cross section of the main flow channel immediately downstream of the bridge channel, i.e. immediately upon joining of the first and second laminar fluid layers (before diffusional mixing in the width direction begins).

Figure 3L:
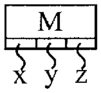
FIG. 3L shows a cross section of the laminar flow in FIG. 3K immediately downstream of the bridge channel.

Similarly, FIG. 3K shows an example of a first laminar fluid layer 55 containing stream M and second laminar fluid layer 60 containing three side by side laminar streams, A, B, and C. Each of side-by-side laminar streams A, B, and C are contacted simultaneously with stream M. FIG. 3L is a cross section of the main flow channel immediately downstream of the bridge channel, i.e. immediately upon joining of the first and second laminar fluid layers (before diffusional mixing in the width direction begins).

Figure 3M:
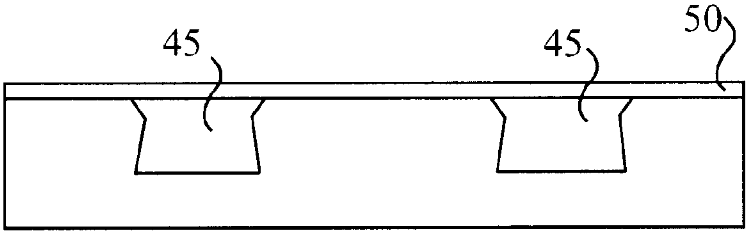
FIG. 3M–P show cross sections of FIG. 3A wherein the bridge channel is in the interior of the first plate.
Figure 3N:
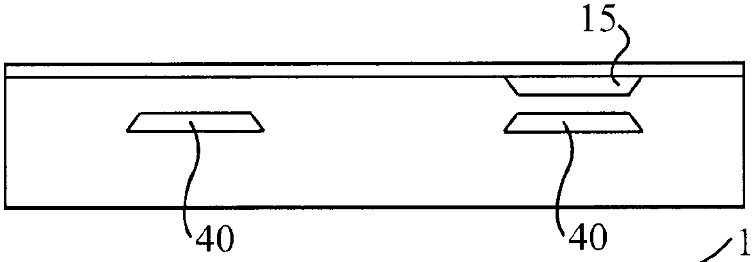
Figure 3O:
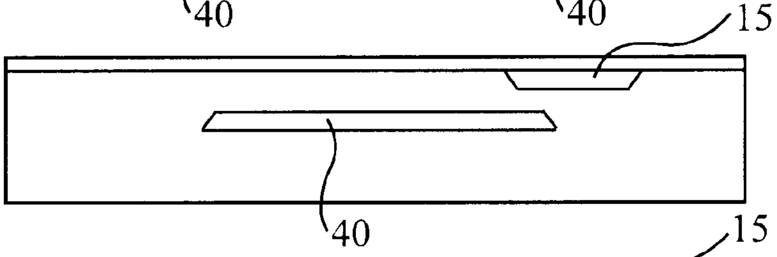
Figure 3P:
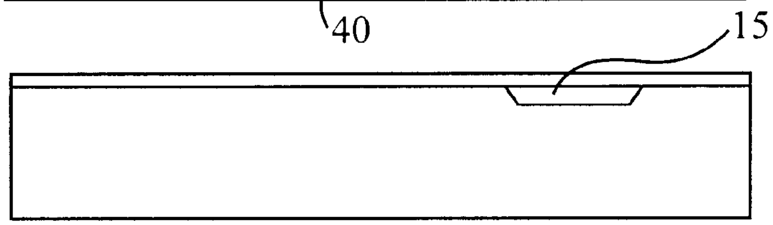

FIGS. 3M–3P are cross sections of FIG. 3A in an alternative embodiment wherein tributary channel 30 and main flow channel 15 lie in first surface 12 of first plate 14, but bridge channel 40 does not lie in the second surface of first plate 14. In this embodiment FIG. 3M is a cross section view similar to that in FIG. 3B, but of an alternative embodiment. FIG. 3N is a cross section view similar to that in FIG. 3C, but of an alternative embodiment. FIG. 3O is a cross section view similar to that in FIG. 3D, but of an alternative embodiment. FIG. 3P is a cross section view similar to that in FIG. 3E, but of an alternative embodiment.

Preferably, tributary channel 30, bridge channel 40, and main flow channel 15 have the same depth to enable retention of flow pattern as fluid layers pass from tributary channel 30, to bridge channel 40, to main flow channel 15, and as fluid layers pass from main flow channel 15, to bridge channel 40, and then to tributary channel 30. Under these conditions second laminar fluid layer 60 is added to first laminar fluid layer 55 across the entire depth of first laminar fluid layer 55.

Figure 4A:
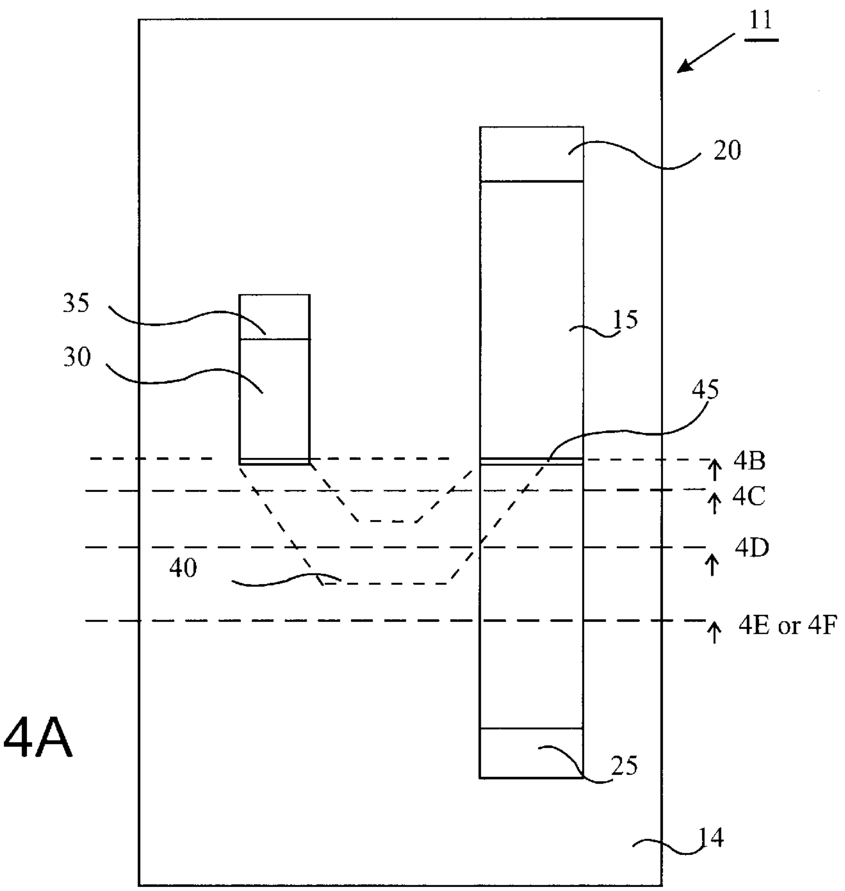
FIG. 4, comprising 4A–4F, shows an embodiment wherein the bridge channel connects along only a portion of the depth on the bottom of the main flow channel and wherein the bridge channel is not formed in the second surface of the plate, i.e., the bridge channel is in the interior of the plate.
Figure 4B:
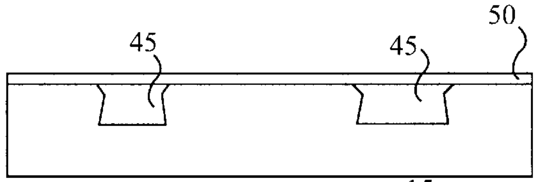
Figure 4C:
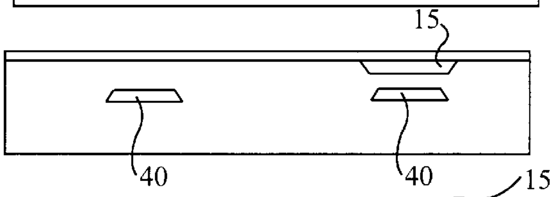
Figure 4D:
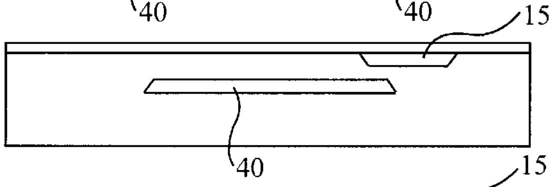
Figure 4E:
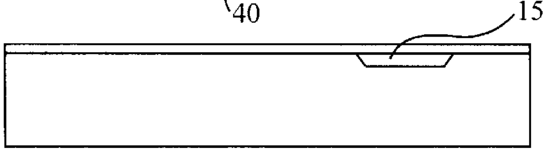
Figure 4F:
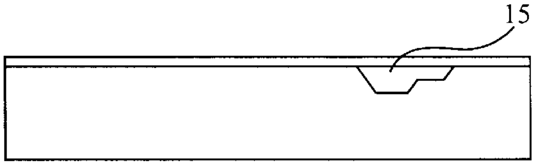

In an alternative embodiment, tributary channel 30, bridge channel 40, and main flow channel 15 do not have the same depth. For example, tributary channel 30 and bridge channel 40 may have the same depth as each other, but one which is smaller than the depth of main flow channel 15, as in FIGS. 4A–4F. Under these conditions, a second laminar fluid layer flowing from tributary channel 30 into bridge channel 40 is added to only a portion of a first laminar fluid layer, e.g. from one side of main flow channel 15 to some position between the first and second sides of main flow channel 15. The resulting laminar fluid layer flowing through main flow channel 15 downstream of bridge channel 40 therefore contains a portion including both a first laminar fluid layer and a second laminar fluid layer and another portion including only a first laminar fluid layer. If a second laminar fluid layer has a depth smaller than that of a first laminar fluid layer, and the width of the main flow channel 15 remains the same upstream and downstream of bridge channel 40 (as in FIG. 4E), then the resulting portion of the laminar fluid containing both the second laminar fluid layer and the first laminar fluid layer flows faster than that portion of the laminar fluid containing only the first laminar fluid layer. Alternatively, the width of main flow channel 15 can be increased in that part of main flow channel 15 where the second laminar fluid layer is added to accommodate the extra volume of fluid. FIG. 4F shows a cross section of an alternative embodiment where the width of the main flow channel 15 increases along part of the depth of the bottom of the channel to accommodate the incoming second fluid layer without a concomitant increase in flow velocity. This increase in width allows the resulting laminar fluid layer to flow at a constant velocity across the entire depth of main flow channel 15.

Bridge channel 40 can be of virtually any shape and include angles of varying degrees, the only limitation being that laminar flow and flow pattern be retained in bridge channel 40.

Figure 5A:
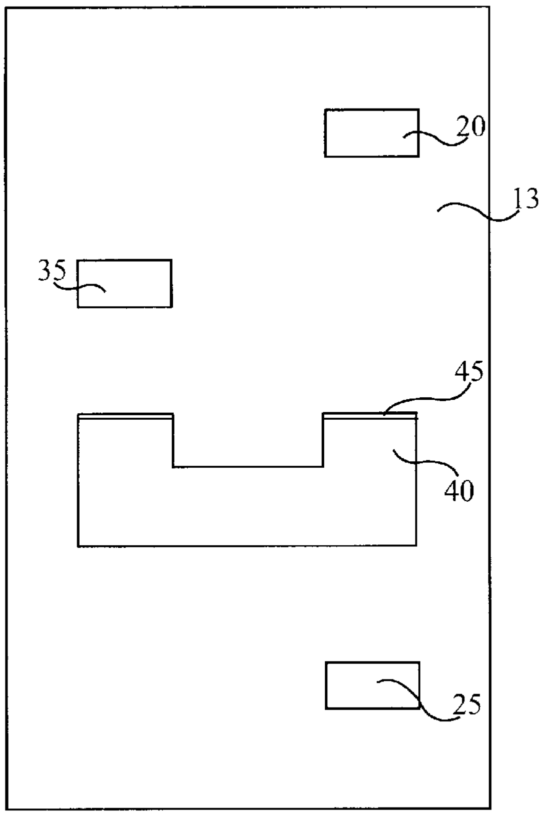
FIG. 5A is a plan view of the second surface of the device of this invention with an alternative embodiment of the bridge channel.

FIG. 5A is a plan view of the second surface 13 of first plate 14 of an alternative embodiment wherein bridge channel 40 includes 90 degree angles.

Figure 5B:
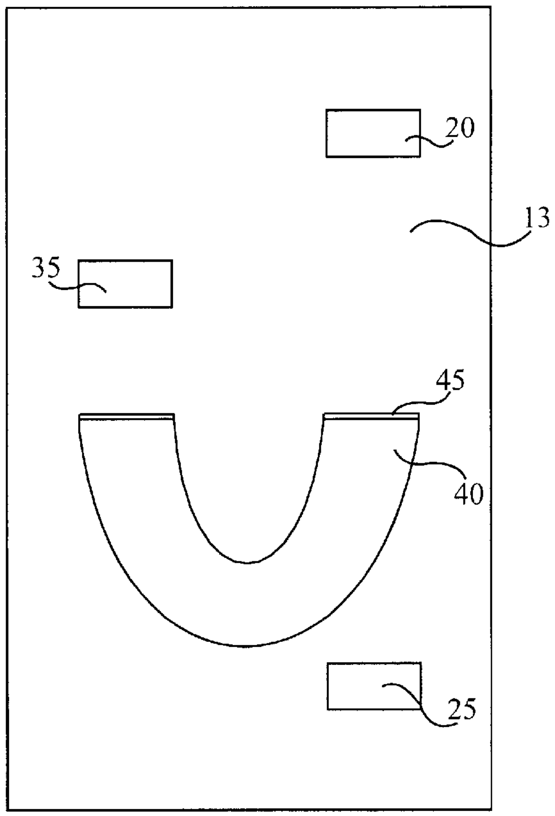
FIG. 5B is a plan view of the second surface of the device of this invention with another alternative embodiment of the bridge channel.

FIG. 5B is a plan view of the second surface 13 of first plate 14 of an alternative embodiment wherein bridge channel 40 includes a curved channel.

Figure 5C:
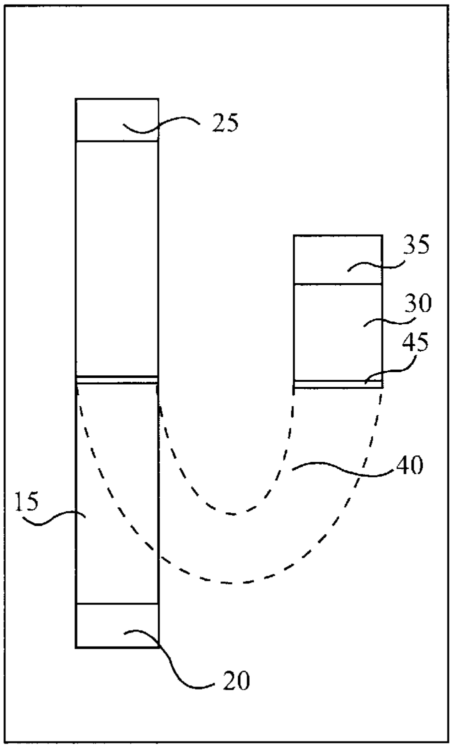
FIG. 5C illustrates a flow cell device 11 of the present invention similar to that shown in FIG. 3A except that the bridge channel is curved (does not have discreet angles) and curves in a direction opposite to the flow direction in the main flow channel.

FIG. 5C illustrates a flow cell device 11 of the present invention similar to that shown in FIG. 3A except that the bridge channel is curved (does not have discreet angles) and curves in a direction opposite to the flow direction in the main flow channel.

Figure 5D:
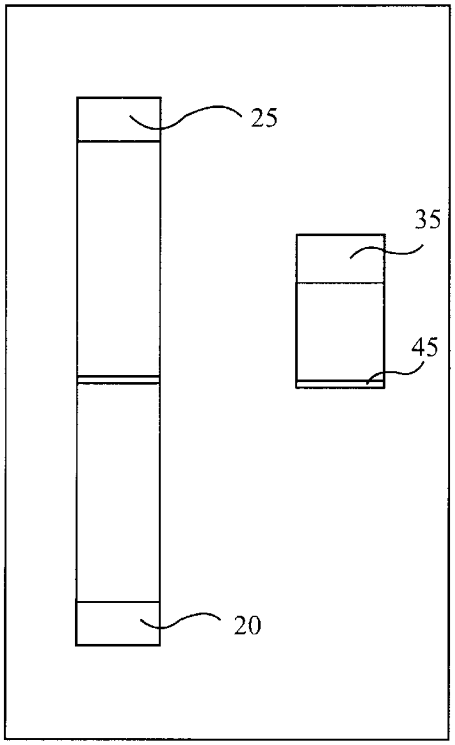
FIG. 5D is a plan view of the first surface 12 of FIG. 5C.

FIG. 5D is a plan view of the first surface 12 of FIG. 5C.

Figure 5E:
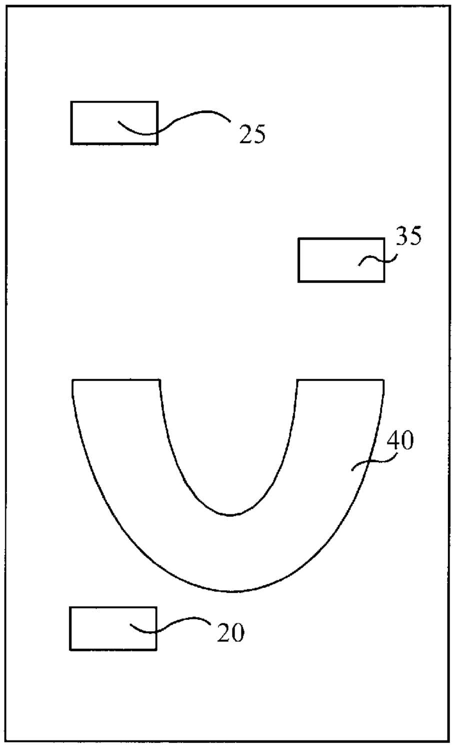
FIG. 5E is a plan view of the second surface 13 of FIG. 5C.

FIG. 5E is a plan view of the second surface 13 of FIG. 5C.

FIG. 6A illustrates a flow cell device 11 of the present invention similar to that shown in FIG. 3A, except that bridge channel 40 is curved, that is, without sharp angles. First inlet port 20 is in fluid connection with main flow channel 15 at the upstream end of main flow channel 15. First outlet port 25 is in fluid connection with main flow channel 15 at the downstream end of main flow channel 15. Tributary port 35 is in fluid connection with tributary channel 30. Tributary channel 30 is also in fluid connection with bridge channel 40, which provides for fluid connection between main flow channel 15 and tributary channel 30 such that the flow pattern of the fluid layer in each channel is preserved. Tributary channel 30 preferably lies in the plane containing main flow channel 15, so that optical monitoring such as detection by absorbance or transmission can be performed with one detector monitoring both channels. Bridge channel 40 is formed in the second surface 13 of plate 14. The first end of tributary channel 30 joins the second end of bridge channel 40 via a first through-hole 45. The first end of bridge channel 40 joins the bottom of the main flow channel 15 via a second through-hole 45. Each of through-holes 45 passes from the first surface of the plate, in which main flow channel 15 and tributary channel 30 are formed, to the second surface of the plate, in which bridge channel 40 is formed.

FIG. 6B is a cross sectional view of FIG. 6A showing first inlet port 20 passing through first plate 14. Main flow channel 15 is formed in first surface 12 and is in fluid connection with through-hole 45, which is in fluid connection with bridge channel 40. Bridge channel 40 is formed in second surface 13 of first plate 14. Main flow channel 15 is in fluid connection with first outlet port 25. Second plate 50, e.g. a cover plate, is sealed to first surface 12. Third plate 51, e.g. a cover plate, is sealed to second surface 13.

FIG. 6C is a cross sectional view of FIG. 6A showing bridge channel 40. Bridge channel 40 is formed in second surface 13 of first plate 14. Second plate 50 is sealed to first surface 12. Third plate 51 is sealed to second surface 13.

FIG. 6D is a cross sectional view of FIG. 6A showing tributary port 35 passing through first plate 14. Tributary channel 30 is formed in first surface 12 and is in fluid connection with through-hole 45, which is in fluid connection with bridge channel 40. Bridge channel 40 is formed in second surface 13 of first plate 14. Second plate 50 is sealed to first surface 12. Third plate 51 is sealed to second surface 13.

FIG. 7A illustrates an embodiment of the device 11 wherein bridge channel 40 is not formed in first plate 14 but comprises tubing, which is in fluid connection first and second through-holes 45 which connect to main flow channel 15 and tributary channel 30. Other elements of the device are labeled as in FIG. 6A. Tubing materials include but are not limited to tygon, teflon, silicon, polyethylene, polyvinyl chloride (PVC), and glass tubing.

FIG. 7B is a lengthwise cross section of FIG. 7A through main flow channel 15, showing bridge channel 40 extending below the second surface of the first plate. Bridge channel 40 extends from through-hole 45 in main flow channel 15 to through-hole 45 in tributary channel 30.

FIG. 7C is a lengthwise cross section of FIG. 7A through the middle of first plate 14 which does not contain main flow channel 15 or tributary channel 30.

FIG. 7D is a lengthwise cross section of FIG. 7A through tributary channel 30, showing bridge channel 40 extending below the second surface 13 of the first plate.

Figure 8A:
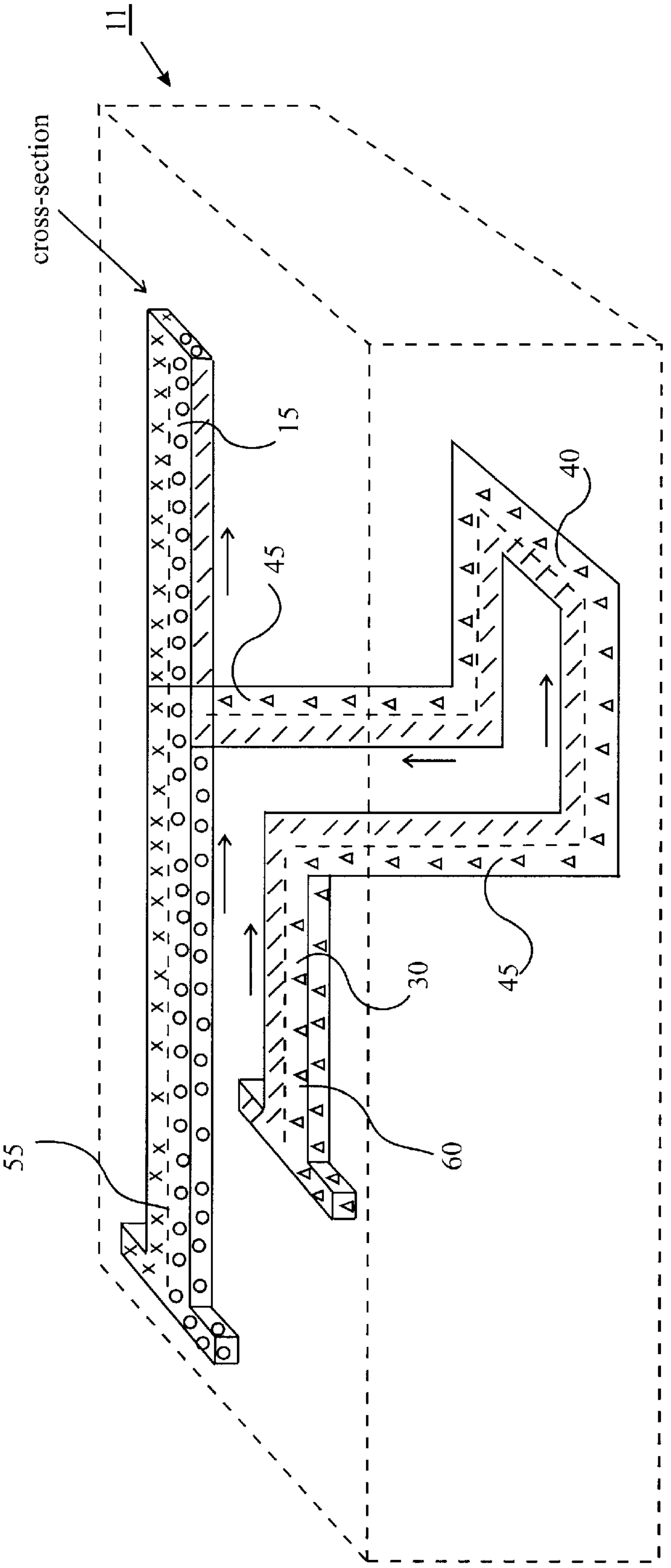
FIG. 8A is a schematic representation of a flow cell device of this invention with a second laminar fluid layer being added to a first laminar fluid layer.

FIG. 8A is a schematic representation of a flow cell device 11 employed in the mixing mode, with first laminar fluid layer 55 containing two side by side laminar streams, the first laminar stream represented by circles and the second laminar stream represented by x's. Second laminar fluid layer 60, the tributary layer, contains two side by side laminar streams, the first laminar stream represented by triangles and the second laminar stream represented by hatching. Second laminar fluid layer 60 flows through tributary channel 30, through a first through-hole 45, through bridge channel 40, through a second through-hole 45, and meets first laminar fluid layer 55 in main flow channel 15. Laminar fluid layers 55 and 60 travel in laminar flow down main flow channel 15. In this example, first laminar fluid layer 55 contains equal volumes of first laminar stream (represented by circles) and second laminar stream (represented by x's), and second laminar fluid layer 60 contains equal volumes of first laminar stream (represented by triangles) and second laminar stream (represented by hatching). Under these conditions particles in second laminar fluid layer 60 diffuse into first laminar fluid layer 55 and vice versa.

Figure 8B:
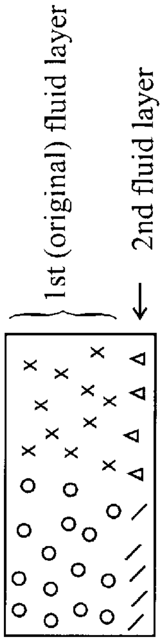
FIG. 8B is a cross section of the main flow channel of FIG. 8A immediately downstream of the through-hole through which second laminar fluid layer is added to first laminar fluid layer.

FIG. 8B is a cross sectional view of main flow channel 15 immediately downstream of the connection of bridge channel 40 to main flow channel 15. Second laminar fluid layer 60 is flowing in a layer below first laminar fluid layer 55.

Figure 8C:
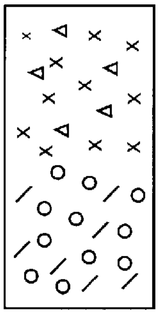
FIG. 8C is a cross section of the main flow channel downstream of FIG. 8B, showing diffusion (mixing) in the width has occurred.

FIG. 8C is a cross sectional view of main flow channel 15 farther downstream compared to FIG. 8B. Particles from second laminar fluid layer 60 have diffused into first laminar fluid layer 55, as shown by hatching interspersed with circles, and triangles interspersed with x's. There is also diffusion of small particles in the depth direction, not shown here. Because the width is smaller than the depth, diffusion in the width direction is more significant than in the depth direction, for a given period of time.

Figure 9:
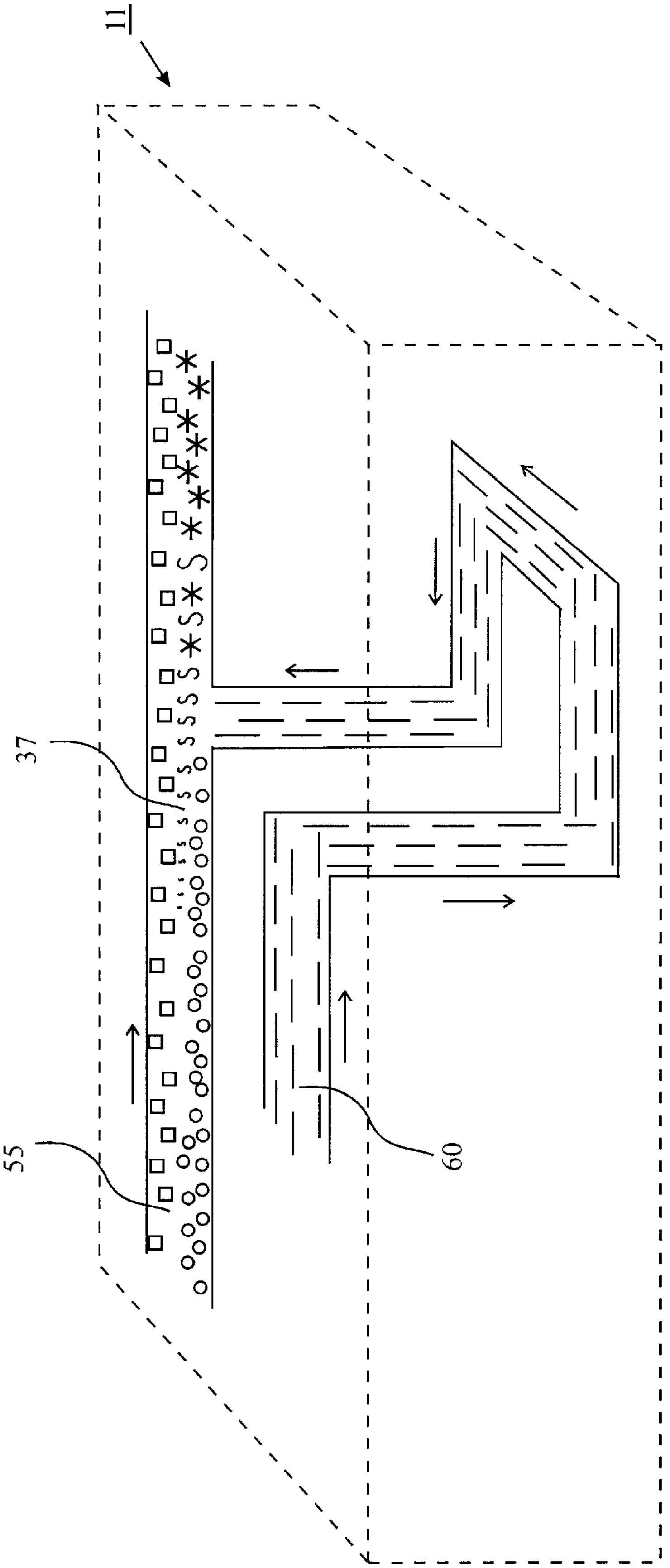
FIG. 9 is a schematic representation of a flow cell device with a second laminar fluid layer being added to a first laminar fluid layer which contains a sample stream, an indicator stream, an analyte detection area where analyte particles from the sample stream have diffused into the indicator stream causing a detectable change. Addition of the second laminar fluid layer causes further detectable change in the first laminar fluid layer.

FIG. 9 is a schematic representation of a flow cell device 11 employed in the mixing mode, with first laminar fluid layer 55 containing two side by side laminar streams, the first laminar stream is an indicator stream, represented by circles, and the second laminar stream is a sample stream, for example whole blood, represented by squares. Small analyte particles from the sample stream diffuse into the indicator stream, causing a detectable change in the indicator stream, representing by wavy vertical lines. The area of the indicator stream containing a detectable change is a first analyte detection area 37. Second laminar fluid layer 60 contains one laminar stream, for example a fluid at low pH (acid), represented by hatching. Second laminar fluid layer 60 can contain particles of reagent, substrate, indicator, and the like, e.g., antibodies, fluorescent dyes, absorbent dyes, chemical markers, nucleic acids, proteins, oligosaccharides, acid, or base. Second laminar fluid layer 60 flows through the tributary channel, through a first through-hole, a through bridge channel, through a second through-hole, and meets first laminar fluid layer 55 in the main flow channel. Laminar fluid layers 55 and 60 travel in laminar flow down the main flow channel, during which time particles in second laminar fluid layer 60 diffuse into first laminar fluid layer 55 and particles in first laminar fluid layer 55 diffuse into second laminar fluid layer 60. Depending on what type of particles are in second laminar fluid layer 60, diffusion of these particles into first laminar fluid layer 55, specifically the indicator stream thereof, can cause a further detectable change, indicated by stars (*) in FIG. 9.

Figure 10:
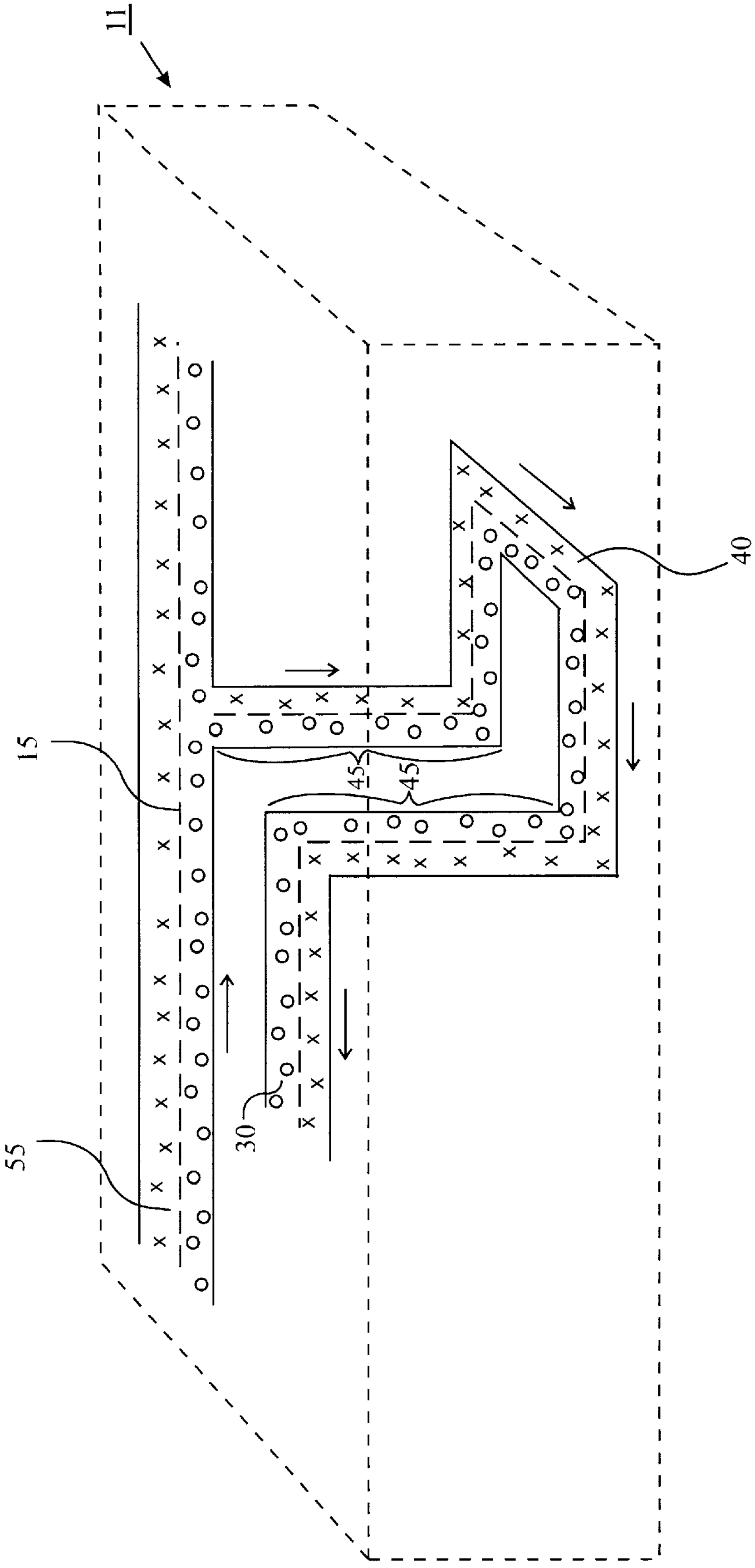
FIG. 10 is a schematic representation of a flow cell device of this invention with a second laminar fluid layer being removed from a first laminar fluid layer.

FIG. 10 is a schematic representation of a flow cell device 11 employed in the splitting mode, with first laminar fluid layer 55 containing two side by side laminar streams, the first laminar stream represented by circles and the second laminar stream represented by x's. First laminar fluid layer 55 flows through main flow channel 15, and a portion thereof (hereinafter called second laminar fluid layer 60) enters a first throughhole 45, flows through bridge channel 40 and into tributary channel 30, where optical monitoring may be performed. Because the depth of through-hole 45, bridge channel 40 and tributary channel 30 are the same as the depth of main flow channel 15, the flow pattern and the original depths of each laminar stream are retained.

Figure 11A:
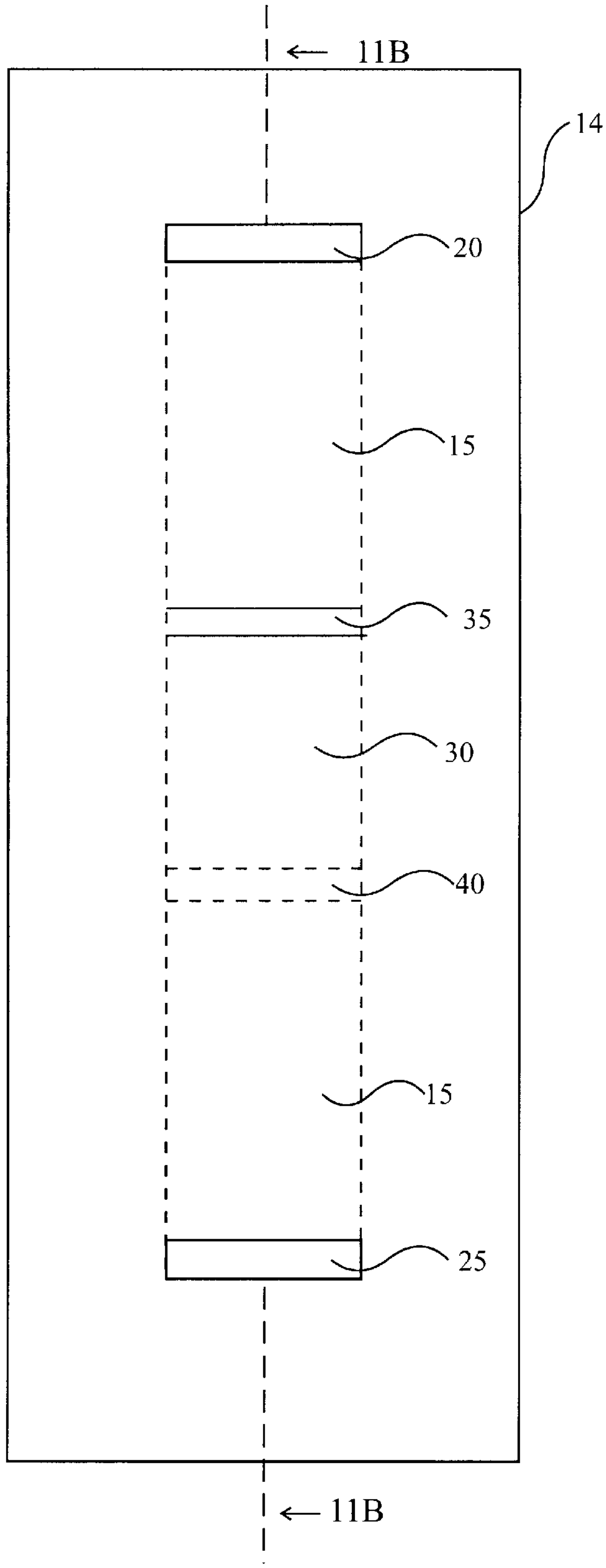
FIG. 11A is a schematic representation of a flow cell device with the main flow channel in the interior of the first plate, the tributary channel is the first surface, and the bridge channel connecting the two.
Figure 11B:
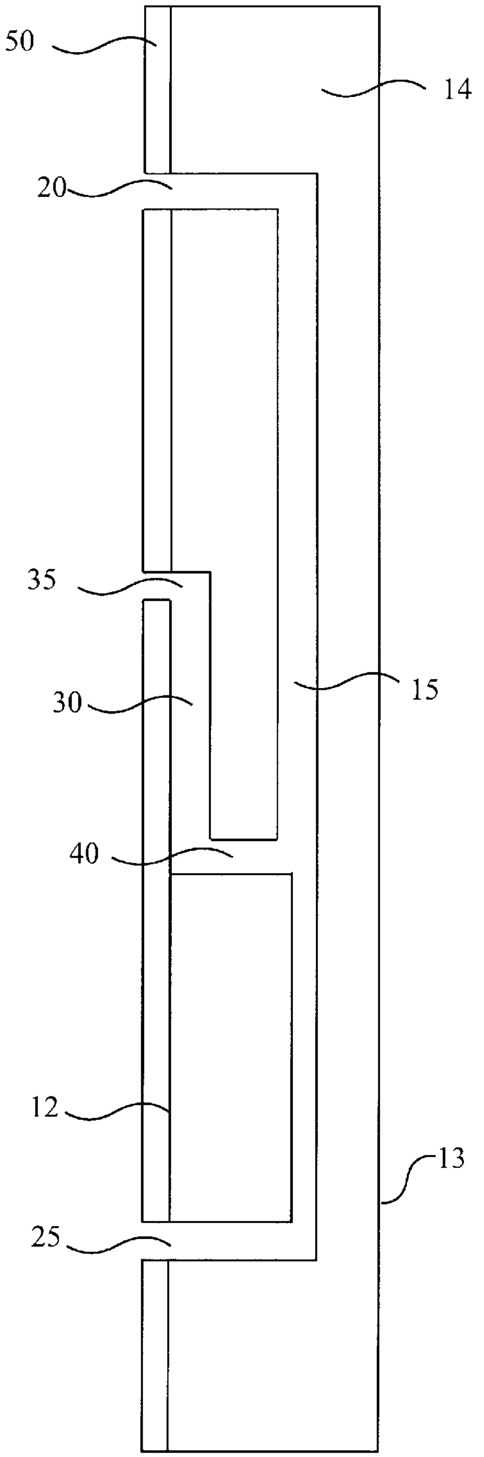
FIG. 11B is a cross section of FIG. 11A.

FIG. 11A is a schematic representation of the present device wherein main flow channel 15 is formed in a plane below the plane containing tributary channel 30, which is formed in the first surface 12 of first plate 14. Main flow channel 15 can lie in the interior of the first plate, as shown in FIG. 11B, or it can lie in second surface 13. Main flow channel 15 is in fluid connection with tributary channel 30 via bridge channel 40.

A given laminar fluid layer may contain 1, 2, 3, or more side by side laminar fluid streams. Laminar fluid layers containing two or more streams can be introduced into the flow cell device via an inlet port from another apparatus with which the device is in fluid connection. That is, a flow system integrating the device of this invention with other devices for fluid handling and analysis provides a means for introducing a laminar fluid layer containing two or more side by side laminar streams into channels 15 or 30 of this device. A device such as those described in U.S. Ser. No. 08/625, 808, "Microfabricated Diffusion-Based Chemical Sensor," filed Mar. 29, 1996, now allowed; U.S. Ser. No. 08/829,679, "Microfabricated Diffusion-Based Chemical Sensor," filed Mar. 31, 1997; U.S. patent application Ser. No. 08/900,926, "Simultaneous Analyte Determination and Reference Balancing in Reference T-Sensor Devices," filed Jul. 25, 1997, now U.S. Pat. No. 5,972,710; U.S. Ser. No. 08/621,170 "Fluorescent Reporter Beads for Fluid Analysis," filed Mar. 20, 1996; U.S. Ser. No. 08/663,916, "Microfabricated Differential Extraction Device and Method," filed Jun. 14, 1996; U.S. Ser. No. 08/534,515, "Silicon Microchannel Optical Flow Cytometer," filed Sep. 27, 1995; PCT No. 96/15566 "Silicon Microchannel Optical Flow Cytometer," filed Sep. 27, 1996; U.S. Ser. No. 08/823,747, "Device and Method For 3-Dimensional Alignment of Particles in Microfabricated Flow Channels," filed Mar. 26, 1997; U.S. Ser. No. 08/876,038, "Adsorption-Enhanced Differential Extraction Device," filed Jun. 13, 1997; U.S. Ser. No. 60/049,533, "Method For Determining Concentration of a Laminar Sample Stream," filed Jun. 13, 1997; U.S. Ser. No. 08,938, 585, "Simultaneous Particle Detection and Chemical Reaction," filed concurrently herewith; Ser. No. 08/938,093, "Multiple Analyte Diffusion Based Chemical Sensor," filed concurrently herewith, can be in fluid connection with the present device, either upstream or downstream of the present device. Alternatively, device 11 may contain multiple inlet ports, each of which provides for introduction of a laminar stream.

Figure 12:
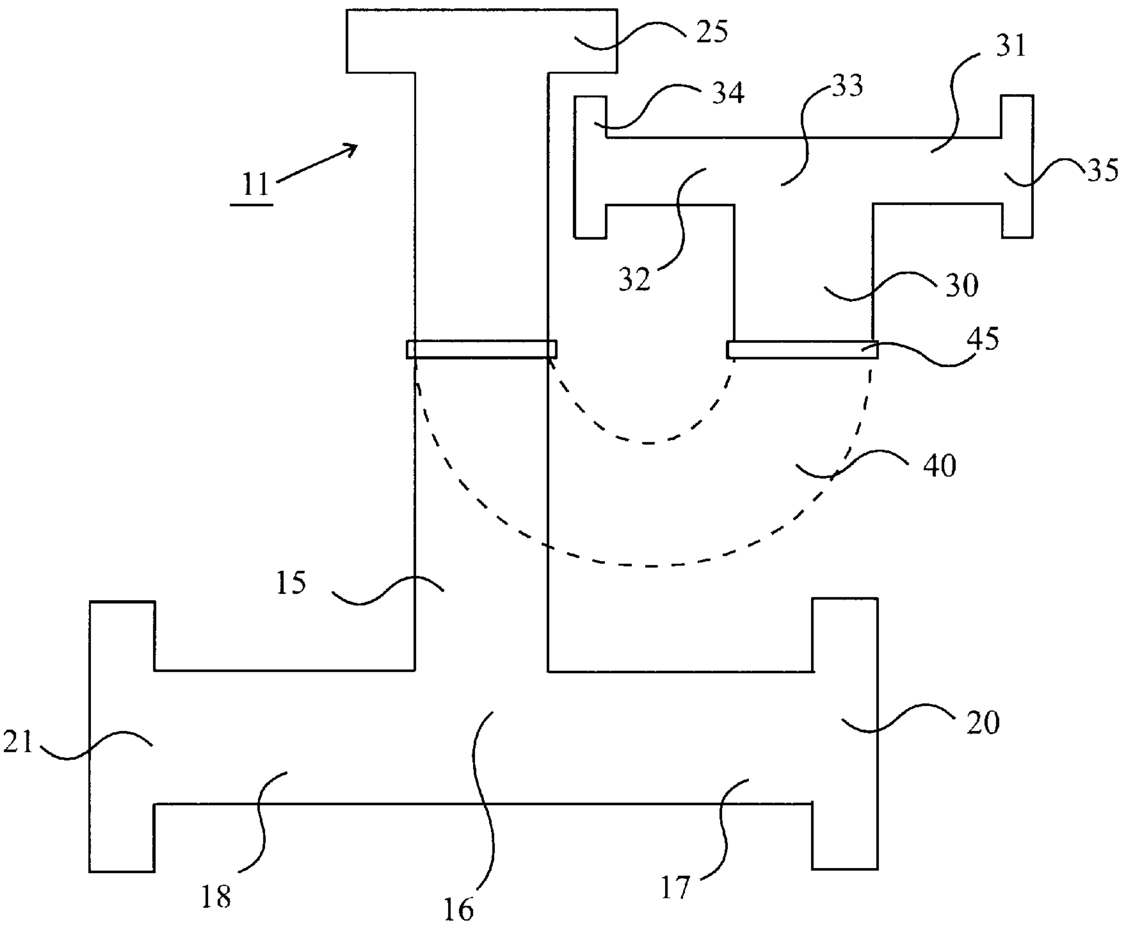
FIG. 12 is a schematic representation of a flow cell device of this invention with two inlet ports to the main flow channel and two tributary ports to the tributary channel.

FIG. 12 illustrates a flow cell device 11 which includes two tributary ports, first tributary port 35 and second tributary port 34. First tributary port 35 provides for introduction into tributary channel 30 of a first laminar fluid stream, and second tributary port 34 provides for introduction into tributary channel 30 of a second laminar fluid stream. Device 11 has first inlet port 20 and second inlet port 21, both in fluid connection with main flow channel 15. First inlet port 20 provides for introduction into main flow channel 15 of a first laminar fluid stream, and second inlet port 21 provides for introduction into main flow channel 15 of a second laminar fluid stream. U.S. patent application Ser. No. 08/625,808, "Microfabricated Diffusion-Based Chemical Sensor," filed Mar. 29, 1996, now allowed, and U.S. patent application Ser. No. 08/829,679, "Microfabricated Diffusion-Based Chemical Sensor," filed Mar. 31, 1997, both of which are incorporated in their entirety by reference herein, describe microsensors which provide for laminar flow of fluid streams and analysis of particles therein. A first fluid stream is introduced into first inlet port 20 and flows down first inlet channel 17, and a second fluid stream is introduced into second inlet port 21 and flows down second inlet channel 18. First inlet channel 17 and second inlet channel 18, and thus the two fluids flowing therein, meet at T-joint 16. From T-joint 16 the two fluids flow down main flow channel 15. A third fluid stream is introduced into first tributary port 35 and flows down first tributary arm 31, and a fourth fluid stream is introduced into second tributary port 34 and flows down second tributary arm 32. First tributary arm 31 and second tributary arm 32, and thus the two fluids flowing therein, meet at tributary T-joint 33. From tributary T-joint 33 the two fluids flow down tributary channel 30.

Figure 13:
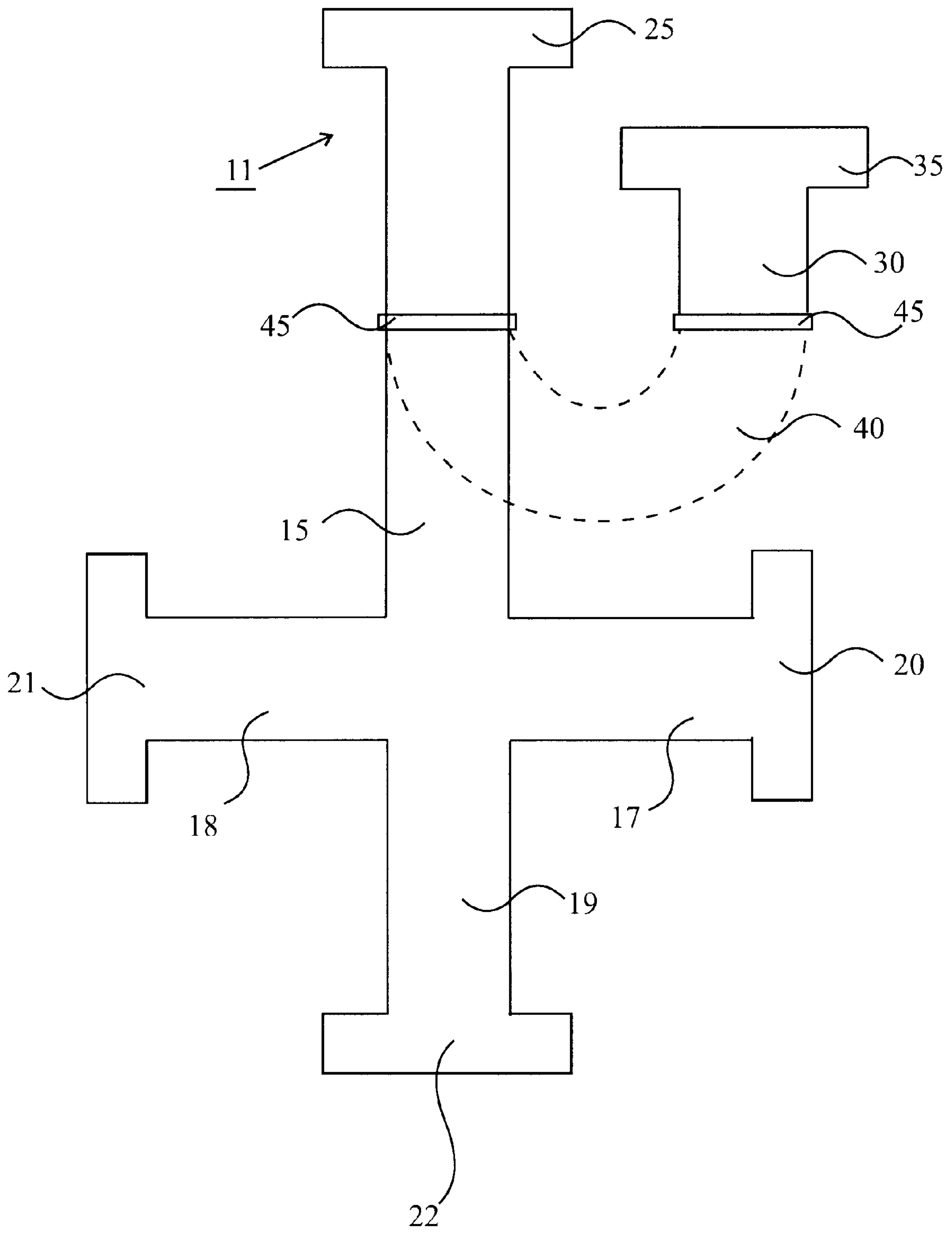
FIG. 13 is a schematic representation of a flow cell device of this invention with three inlet ports to the main flow channel.

U.S. patent application Ser. No. 08/900,926, "Simultaneous Analyte Determination and Reference Balancing in Reference T-Sensor Devices," filed Jul. 25, 1997, which is incorporated in its entirety by reference herein, describes flow cell devices with three or more inlet ports for introducing three or more side by side laminar streams into a main flow channel. FIG. 13 illustrates a flow cell device with three inlet ports: first inlet port 20, second inlet port 21, and third inlet port 22. Each inlet port is in fluid connection with a corresponding inlet channel: 17, 18, and 19, respectively, all of which are in fluid connection with main flow channel 15. Three fluid streams are introduced into the three inlet ports and flow in laminar fashion as a first laminar fluid layer 55 down main flow channel 15. At through-hole 45 which joins main flow channel 15, one of two events occurs. In the splitting mode, a portion, i.e., a layer, of the first laminar fluid layer (hereinafter referred to as a second laminar fluid layer) can be split off of the first laminar fluid layer and flow into bridge channel 40 and then into tributary channel 30. Alternatively, in the mixing mode, the second laminar fluid layer, introduced via tributary port 35 and having passed through tributary channel 30 and then through bridge channel 40, contacts and is layered with the first laminar fluid layer. Small particles diff-use across the width of main flow channel 15.

Figure 14:
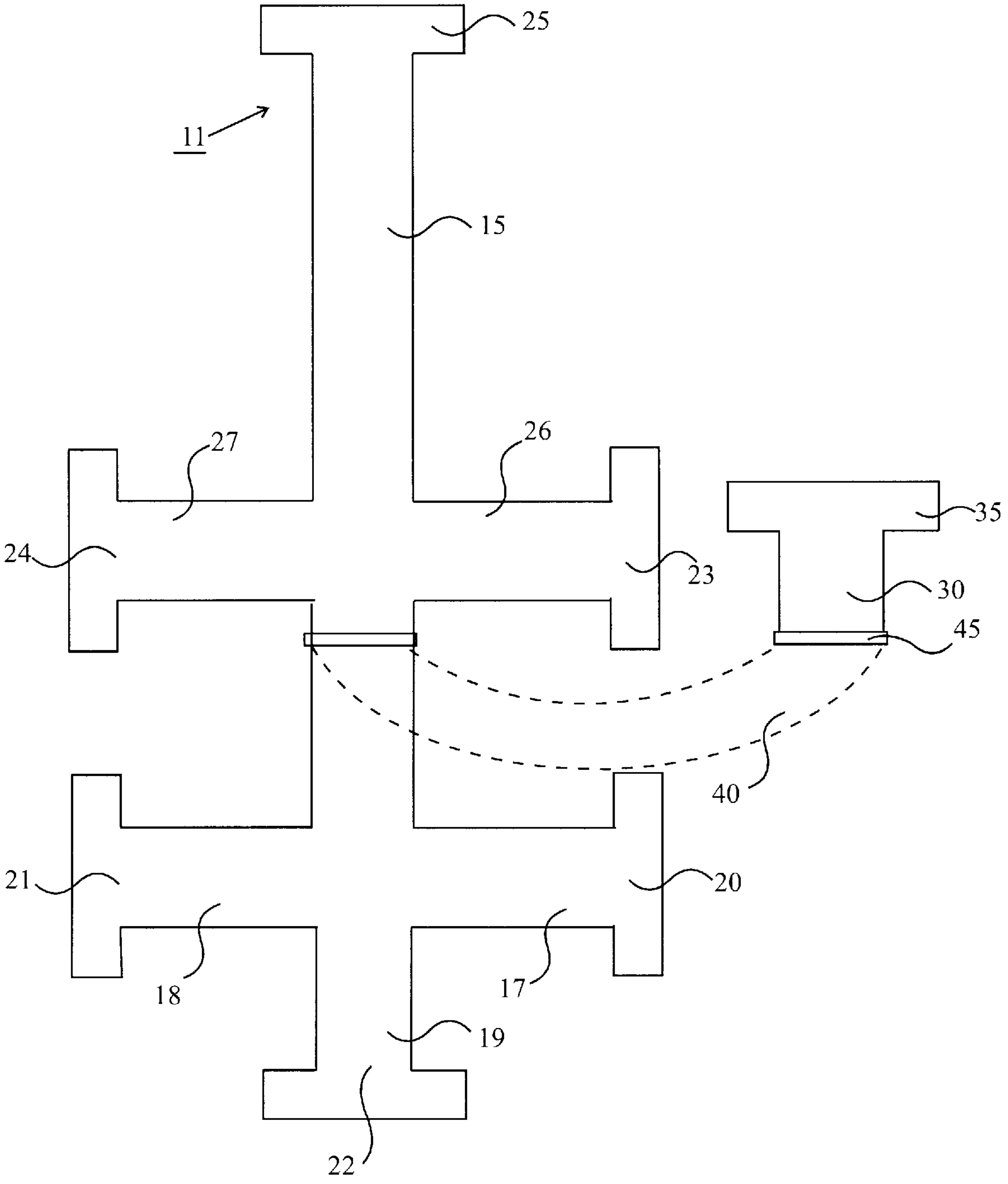
FIG. 14 is a schematic representation of a flow cell device of this invention with five inlet ports to the main flow channel, three of which are upstream and two of which are downstream of the bridge channel.

FIG. 14 illustrates a flow cell device 11 similar to that shown in FIG. 13 except that it has five inlet ports: first inlet port 20, second inlet port 21, third inlet port 22, fourth inlet port 23, and fifth inlet port 24 all of which are in fluid connection with main flow channel 15. Fourth inlet channel 26 and fifth inlet channel 27 are in fluid connection with fourth inlet port 23 and fifth inlet port 24, respectively. In FIG. 14 bridge channel 40 connects with main flow channel 15 downstream of first inlet port 20, second inlet port 21, and third inlet port 22, and upstream of fourth inlet port 23, and fifth inlet port 24. However, bridge channel 40 can connect with main flow channel 15 upstream or downstream of any of the inlet ports.

Figure 15:
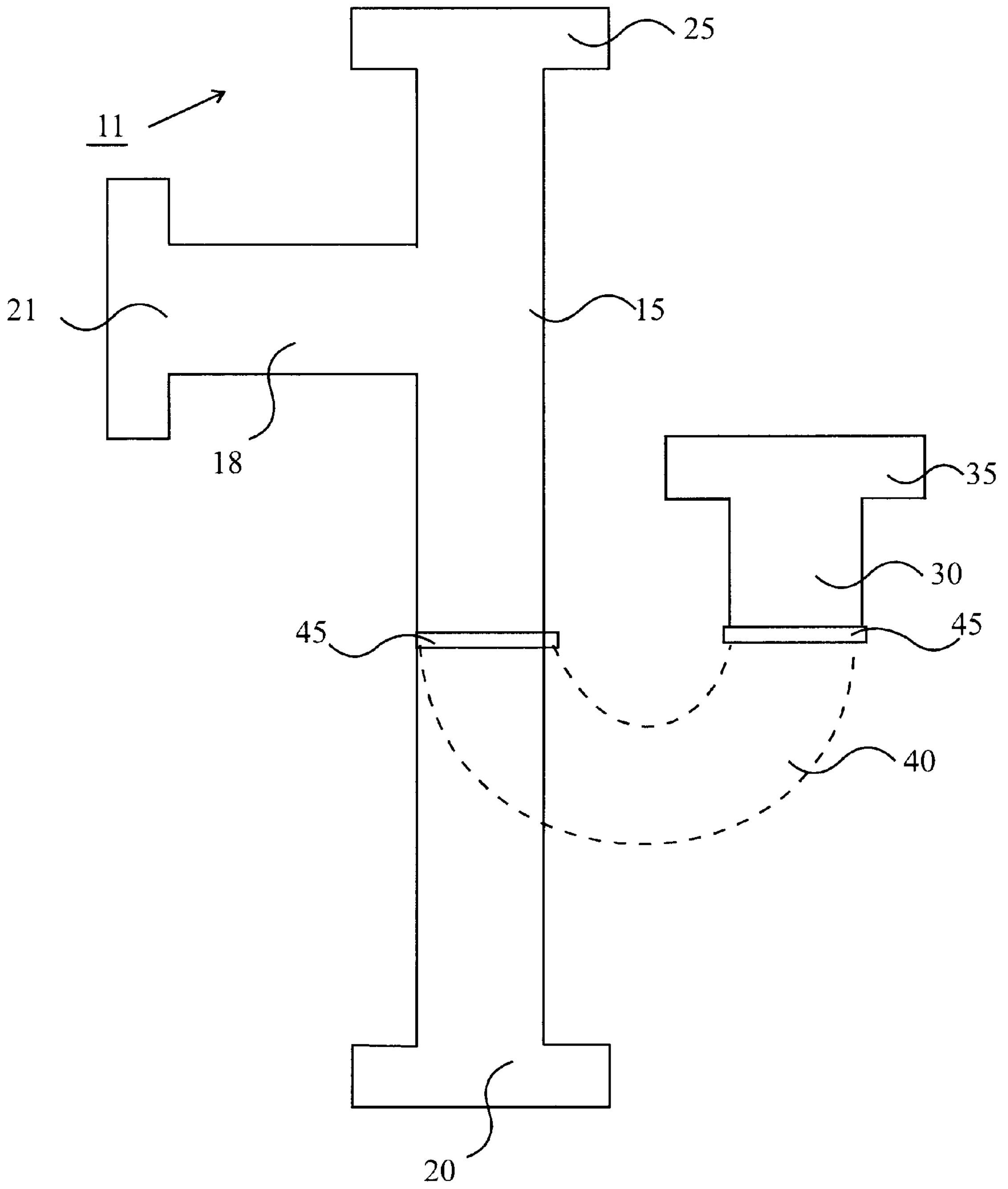
FIG. 15 is a schematic representation of a flow cell device of this invention with two inlet ports, one upstream and one downstream of the through-hole which connects the bridge channel to the main flow channel.

FIG. 15 illustrates a flow cell device 11 which has a first inlet 20, from which a first laminar fluid layer can flow down main flow channel 15. At a first through-hole 45 which connects bridge channel 40 to main flow channel 15 a second laminar fluid layer can be added to or removed from the first laminar fluid layer. Downstream of this first through-hole 45 a second fluid stream can be introduced via second inlet port 21 and second inlet channel 18. The width of second inlet channel 18 can be the same as the width of main flow channel 15 where the two connect, or the width of second inlet channel 18 can be smaller than the width of main flow channel 15. In the latter case, the second fluid stream entering from second inlet channel 18 will initially contact only a portion of the width of the laminar fluid layer flowing in main flow channel 15. Small particles in the second fluid stream diff-use into the laminar fluid layer in the depth direction.

Figure 16:
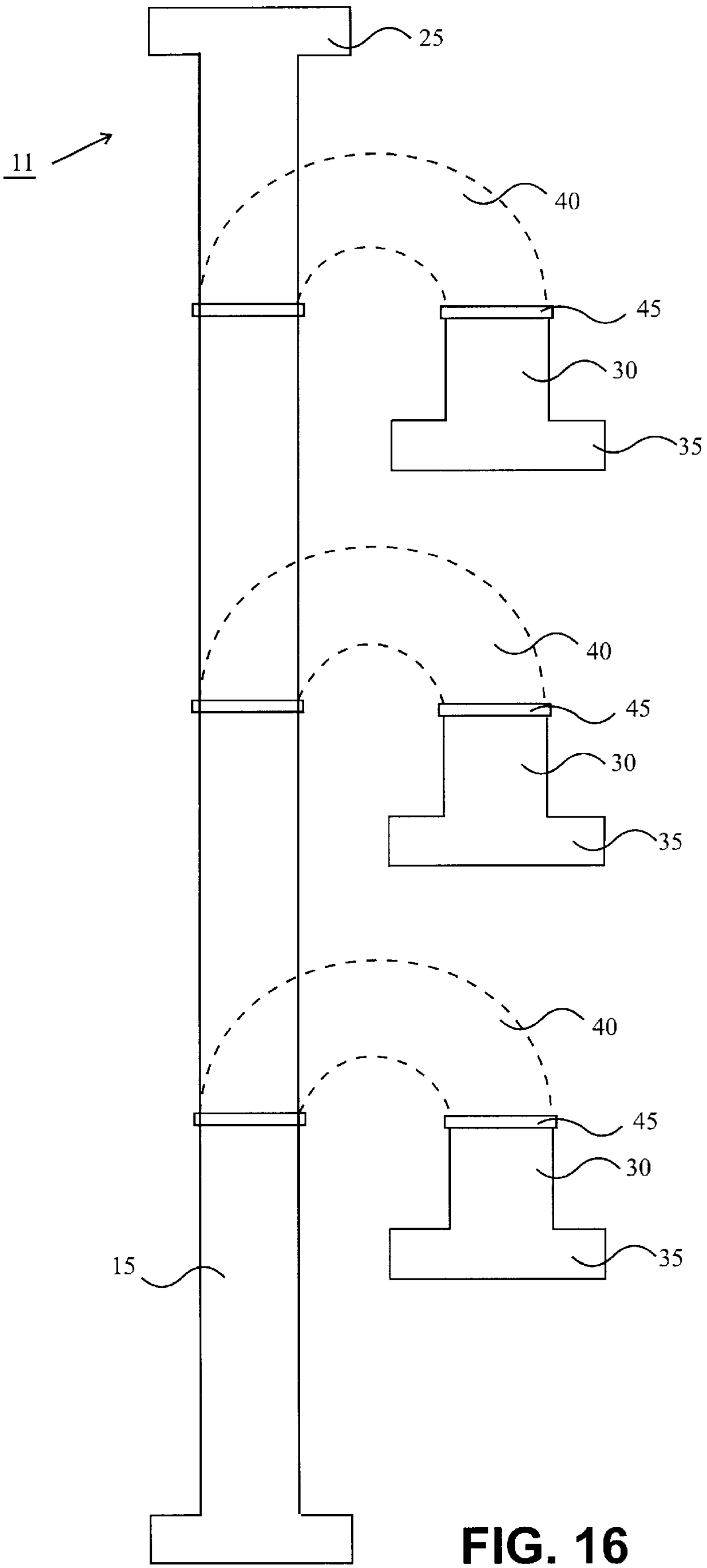
FIG. 16 is a schematic representation of a flow cell device with a plurality of bridge channels.

FIG. 16 illustrates a flow cell device 11 which has three bridge channels. The plurality of bridge channels allows for splitting off a second laminar fluid layer, as well as an analogous third laminar fluid layer, and a fourth laminar fluid layer. Alternatively, a second laminar fluid layer, a third laminar fluid layer, and a fourth laminar fluid layer can be added sequentially. Detection can be performed in each of the tributary channels 30.

Figure 17:
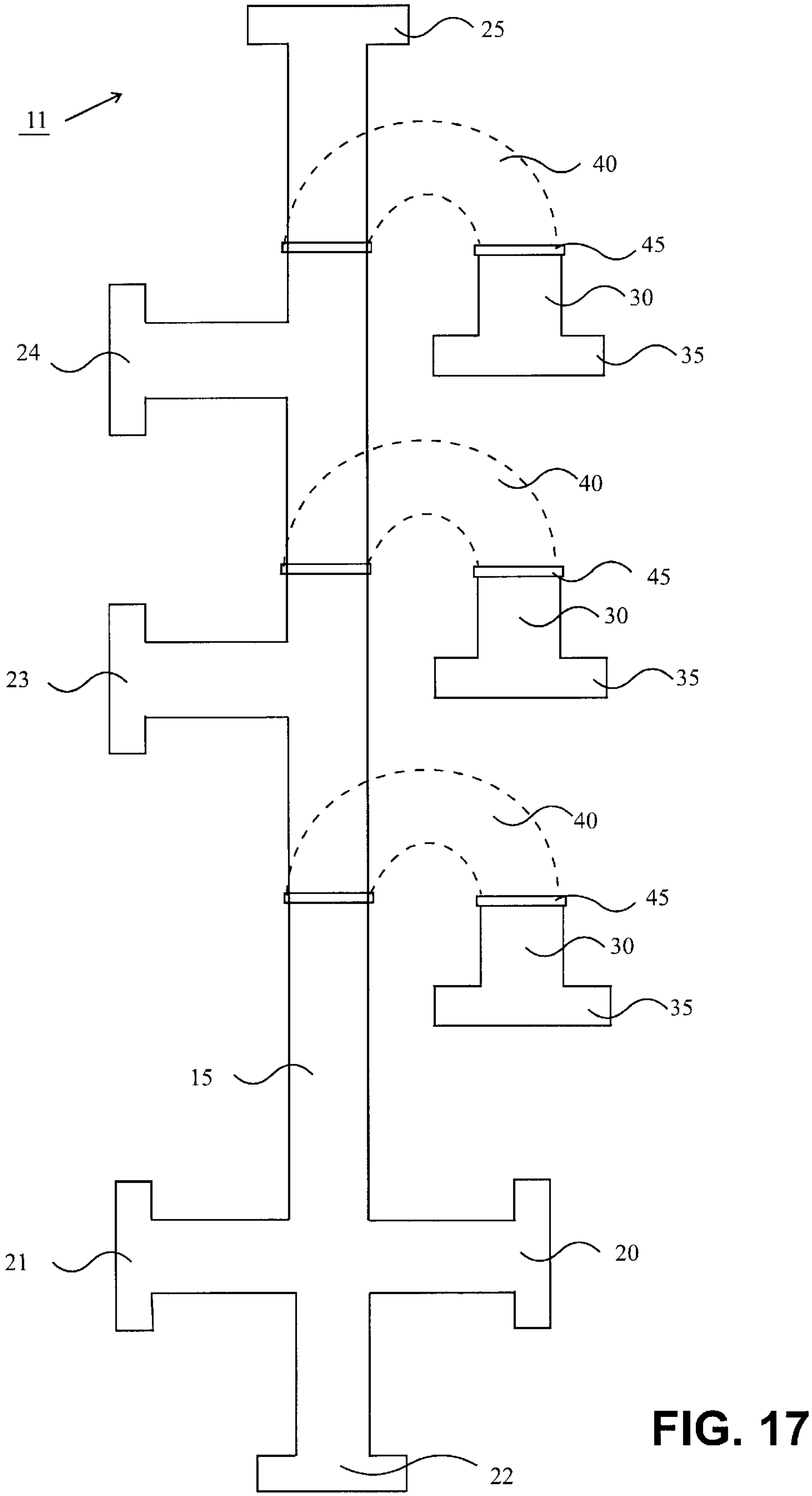
FIG. 17 is a schematic representation of a flow cell device with a plurality of bridge channels and a plurality of inlet ports to the main flow channel.

FIG. 17 illustrates a flow cell device 11 similar to that shown in FIG. 16 except that it includes additional (fourth and fifth) inlet ports, downstream of the first and second bridge channels.

In the simplest practice of this invention, each laminar fluid layer contains only one laminar stream. In the next simplest practice of this invention, one laminar fluid layer contains two side by side laminar streams, e.g. a single indicator stream and a single sample stream, and another laminar fluid layer contains a single laminar stream. However, the methods and devices of this invention may use a plurality of laminar fluid layers, each containing multiple side by side laminar streams.

This invention further provides a method for introducing a second laminar fluid layer to a first laminar fluid layer in a main laminar flow channel. The method includes the step of:

(a) establishing laminar flow of the first laminar fluid layer in the main flow channel;

(b) establishing laminar flow of the second laminar fluid layer in the tributary channel; and (c) adding the second laminar fluid layer to the first laminar fluid layer along the depth of the bottom of the main flow channel.

As described above, either the first laminar fluid layer or second laminar fluid layer may contain particles which diffuse into the other laminar fluid layer.

This invention further provides a method for removing a second laminar fluid layer from a first laminar fluid layer in a main flow channel. The method includes the steps of:

(a) establishing a first laminar fluid layer in a main flow channel; and (b) removing a portion of the first laminar fluid layer along the depth of the bottom of the main flow channel.

The method can further include the following step:

(c) allowing the second laminar fluid layer to flow into a tributary channel which is in fluid connection with the bridge channel.

The second laminar fluid layer can be added to or removed from the entire depth of the main flow channel or only a portion thereof.

The preferred embodiments of this invention utilize liquid streams, although the methods and devices are also suitable for use with gaseous streams. The term "fluid connection" means that fluid flows between the two or more elements which are in fluid connection with each other.

The term "detection" as used herein means determination that a particular substance is present. Typically, the concentration of a particular substance is determined. The methods and apparatuses of this invention can be used to determine the concentration of analyte particles in a sample stream. The rate of a reaction can be determined by rapidly mixing a quencher or reagent into a reaction mixture and measuring product concentration and/or reactant concentration at various distances along the length of the flow channel. Those in the art will understand that reaction rates can be determined by the methods and devices of this invention for reactions wherein the diffusional mixing of the reactants is not rate-limiting. A reaction occurring in a first laminar fluid layer can be quenched by the addition of a second laminar fluid layer containing a substance which quenches (stops) the reaction, e.g., acid can be added to many reactions to quench them.

The channel cell system of this invention may comprise external detecting means for detecting changes in an indicator substance carried within the indicator stream as a result of contact with analyte particles. Detection and analysis is done by any means known to the art, including optical means, such as optical spectroscopy, e.g., absorbance, fluorescence, and chemiluminescence; by chemical indicators which change color or other properties when exposed to the analyte; by immunological means; electrical means, e.g.

electrodes inserted into the device; electrochemical means; radioactive means; or virtually any microanalytical technique known to the art including magnetic resonance techniques, or other means known to the art to detect the presence of an analyte such as an ion, molecule, polymer, virus, DNA sequence, antigen, microorganism or other factor. Those skilled in the art will recognize that combinations of detecting means can be useful. Preferably optical or fluorescent means are used, and antibodies, DNA sequences and the like are attached to fluorescent markers.

A detection device, if used, is preferably positioned to monitor along the depth of the channel. Monitoring along the width is possible. Preferred widths range from about 5 microns to about 500 microns, more preferred widths range from about 50 microns to about 100 microns.

The term "particles" refers to any particulate material including molecules, cells, suspended and dissolved particles, ions and atoms.

The input laminar fluid layers may contain any stream containing particles of the same or different size, for example blood or other body fluid, contaminated drinking water, contaminated organic solvents, urine, biotechnological process samples, e.g. fermentation broths, and the like. A sample stream may contain particles larger than the analyte particles which are also sensitive to the indicator substance. These do not diffuse into the indicator stream and thus do not interfere with detection of the analyte. The analyte may be any smaller particle in an input sample stream which is capable of diffusing into an indicator stream in the device, e.g. hydrogen, calcium or sodium ions, proteins, e.g. albumin, organic molecules, drugs, pesticides, and other particles. When the sample stream is whole blood, small ions such as hydrogen and sodium diffuse rapidly across the channel, whereas larger particles such as those of large proteins, blood cells, etc. diffuse slowly. Preferably the analyte particles are no larger than about 3 micrometers, more preferably no larger than about 0.5 micrometers, or are no larger than about 1,000,000 MW, and more preferably no larger than about 50,000 MW.

The system can include an indicator stream introduced into one of the inlet ports comprising a liquid carrier containing substrate particles such as polymers or beads having an indicator substance immobilized thereon. The indicator substance is preferably a substance which changes in fluorescence or color in the presence of analyte particles, such as a dye, enzymes, and other organic molecules that change properties as a function of analyte concentration. The term "indicator substance" is also used to refer to polymeric beads, antibodies or the like having dyes or other indicators immobilized thereon. It is not necessary that the indicator stream comprise an indicator substance when detection means such as those directly detecting electrical, chemical or other changes in the indicator stream caused by the analyte particles are used. The liquid carrier can be any fluid capable of accepting particles diffusing from the sample stream and containing an indicator substance. Preferred liquid carriers comprise water and isotonic solutions such as salt water with a salt concentration of about 10 mM NaCl, KCl or MgCl, or organic solvents like acetone, isopropyl alcohol, ethanol, or any other liquid convenient which does not interfere with the effect of the analyte on the indicator substance or detection means.

The flow cell device of the present invention can be used with reporter beads to measure pH, oxygen saturation and ion content, in biological fluids. (U.S. patent application Ser. No. 08/621,170 "Fluorescent Reporter Beads for Fluid Analysis," which is incorporated by reference herein in its entirety, discloses fluorescent and absorptive reporter molecules and reporter beads.) Reporter beads can also be used to detect and measure alcohols, pesticides, organic salts such as lactate, sugars such as glucose, heavy metals, and drugs such as salicylic acid, halothane and narcotics. Each reporter bead comprises a substrate bead having a plurality of at least one type of fluorescent reporter molecules immobilized thereon. Plurality as used herein refers to more than one. A fluorescent property of the reporter bead, such as intensity, lifetime or wavelength, is sensitive to a corresponding analyte. Reporter beads are added to a fluid sample and the analyte concentration is determined by measuring fluorescence of individual beads, for example, in a flow cytometer. Alternatively, absorptive reporter molecules, which change absorbance as a function of analyte concentration, can be employed. The use of reporter beads allows for a plurality of analytes to be measured simultaneously, and for biological cells, the cell content can also be measured simultaneously. A plurality of analytes can be measured simultaneously because the beads can be tagged with different reporter molecules.

The method of this invention is designed to be carried out such that all flow is laminar. In general, this is achieved in a device comprising microchannels of a size such that the Reynolds number for flow within the channel is below about 1, preferably below about 0.1. Reynolds number is the ratio of inertia to viscosity. Low Reynolds number means that inertia is essentially negligible, turbulence is essentially negligible, and, the flow of two adjacent streams is laminar, i.e. the streams do not mix except for the diffusion of particles as described above. Flow can be laminar with Reynolds number greater than 1. However, such systems are prone to developing turbulence when the flow pattern is disturbed, e.g., when the flow speed of a stream is changed, or when the viscosity of a stream is changed.

Fluid dynamic behavior is directly related to the Reynolds number of the flow. As the Reynolds number is reduced, flow patterns depend more on viscous effects and less on inertial effects. Below a certain Reynolds number, e.g., about 1, inertial effects can essentially be ignored. The microfluidic devices of this invention do not require inertial effects to perform their tasks, and therefore have no inherent limit on their miniaturization due to Reynolds number effects. The devices of this invention provide for laminar, non-turbulent flow and are designed according to the foregoing principles to produce flow having low Reynolds numbers, i.e. Reynolds numbers below about 1.

The devices of the preferred embodiment of this invention are capable of handling and analyzing a fluid volumes between about 0.01 microliters and about 20 microliters within a few seconds, e.g. within about three seconds. They also may be reused. Clogging is minimized and reversible. The sizes and velocities of 100 $\mu$m wide and 100 $\mu$m/s, for example, indicate a Reynolds number ($R_e$=plv/η) of about $10^{-2}$ so that the fluid is in a regime where viscosity dominates over inertia.

The main flow channel is long enough to permit enough diffusion to occur to have a detectable effect on an indicator substance or detection means in cases where detection is performed, e.g. long enough for small analyte particles to diffuse from a sample stream into an indicator stream, preferably at least about 2 mm long. In general, for small particles such as protons, sodium ions and the like, a minimum length of 500 microns is adequate.

By adjusting the configuration of the channels in accordance with the principles discussed above to provide an appropriate channel length, flow velocity and contact time, for example between a sample stream and an indicator stream in a first laminar fluid layer, the size of the particles remaining in the sample stream and diffusing into the indicator stream can be controlled. The contact time required can be calculated as a function of the diffusion coefficient of the particle D and the distance d over which the particle must diffuse by $2t=d^2/D$.

As stated above, the dimensions of the channels of the device of this invention are chosen so that laminar flow is preserved. The length of the main flow channel is preferably between about 0.5 mm and about 10 mm, more preferably between about 1 mm and about 5 mm. The depth of the main flow channel is preferably between about 100 microns to about 900 microns, more preferably about 400 microns. The width of the main flow channel is preferably between about 20 microns and about 80 microns, more preferably about 50 microns.

The length of the tributary channel is preferably between about 0.5 mm and about 10 mm, more preferably between about 1 mm and about 5 mm. The depth of the tributary channel is preferably the same as that of the main flow channel, between about 100 microns to about 900 microns, more preferably about 400 microns. The width of the tributary channel is preferably smaller than that of the main flow channel, between about 20 microns and about 80 microns, more preferably about 50 microns, in cases where it is preferable to minimize changes in flow velocity resulting from the volume of the added fluid.

The term "aspect ratio" as used herein refers to the ratio of the width to the depth of a channel.

In the mixing mode, the aspect ratio of the channels (main flow channels, bridge channels and tributary channels) is preferably less than 1. There is no theoretical lower limit to this aspect ratio. In the splitting mode, there is no theoretical upper or lower limit to the aspect ratio. An aspect ratio of 1/8 is convenient for many cases.

The length of the bridge channel is theoretically unlimited, as long as laminar flow is maintained. The depth of the bridge channel is preferably the same as that of the main flow channel and the tributary channel, i.e., between about 100 microns to about 900 microns, more preferably about 400 microns. The width of the bridge channel is preferably the same as that of the tributary channel, e.g., between about 20 microns and about 80 microns, more preferably about 50 microns.

Those skilled in the art will understand that in some cases it is preferable for the width to be greater than the depth. Consideration of the application of the device, diffusion coefficients of particles in the fluids, reaction kinetics, flow velocity, and the like guides the choice of channel dimensions. For example, if the first laminar fluid layer contains two side by side streams, one of which contains large particles (which have small diffusion coefficients and diffuse slowly) and the second laminar fluid layer contains small particles (which have large diffusion coefficients and diffuse quickly), the main laminar flow channel can have a relatively small depth, while the width can be relatively large. Large particles in the first layer do not diffuse a large distance quickly from one side by side stream to the other side by side stream, and if this diffusion is desired, then the depth should be small. Small particles in the second laminar fluid layer diffuse quickly to the first laminar fluid layer, thus the width can be relatively large.

Tubes, syringes, and the like provide means for injecting fluids into the device via inlet ports. Receptacles for the fluids, means inducing flow by capillary action, pressure, gravity, and other means known to the art provide for removing fluids from outlet ports.

Means for applying pressure to the flow of the input fluids through the device can also be provided. Such means can be provided at the feed inlets and/or the outlet (e.g. as vacuum exerted by chemical or mechanical means). Means for applying such pressure are known to the art, for example as described in Shoji, S. and Esashi, M. (1994), "Microflow devices and systems," J. Micromechanics and Microengineering, 4:157–171, and include the use of a column of water or other means of applying water pressure, electroendoosmotic forces, optical forces, gravitational forces, and surface tension forces. Pressures from about $10^{-6}$ psi to about 10 psi may be used, depending on the requirements of the system. Preferably about $10^{-3}$ psi is used. Most preferred pressures are between about 2 mm and about 100 mm of water pressure.

The devices of this invention may be formed by any techniques known to the art, preferably by etching the flow channels onto the horizontal surface of a silicon microchip and placing a lid, preferably of an optically clear material such as glass or a silicone rubber sheet, on the etched substrate. Other means for manufacturing the channel cells of this invention include using silicon structures or other materials as a template for molding the device in plastic, micromachining, and other techniques known to the art. The use of precision injection molded plastics to form the devices is also contemplated. Microfabrication techniques are known to the art, and more particularly described below.

The flow cell device of this invention can be manufactured by following the general description below. Through-holes are formed in a plate, e.g. a silicon wafer can be etched by methods known to those of ordinary skill in the art. If etching of a silicon wafer is used to make the device, then photoresist is applied to one side, i.e. the first surface, of the plate, to make a mask (negative) for the main flow channel and tributary channel. Photoresist is also applied to the other side, i.e. the second surface, of the plate, to make a mask (negative) for the bridge channel. The plate is then submerged in a bath of etching solution. After etching of channels, cover plates are placed on and sealed to both surfaces of the plate so that the channels are covered but the inlet and outlet ports (including tributary ports) are not covered.

The devices of this invention and the channels therein can be sized as determined by the size of the particles desired to be detected. As is known in the art, the diffusion coefficient for particles is generally inversely related to the size of the particle. Once the diffusion coefficient for the particles desired to be detected is known, the contact time of the side by side streams with each other and the laminar fluid layers with each other, size of the channels, relative volumes of the streams, pressure and velocities of the streams can be adjusted to achieve the desired diffusion pattern.

Numerous embodiments besides those mentioned herein will be readily apparent to those skilled in the art and fall within the range and scope of this invention. All references cited in this specification are incorporated in their entirety by reference herein.

We claim:

1. A device for joining a second laminar fluid layer to, or removing a second laminar fluid layer from, a first laminar fluid layer, said device comprising:

a first plate having a first surface and a second surface, said first plate having formed therein:

a main flow channel formed in said first surface, said main flow channel having an upstream end, a downstream end, a top and a bottom;

a tributary channel having a first end and a second end;

a first inlet port in fluid connection with said upstream end of said main flow channel;

a first outlet port in fluid connection with said downstream end of said main flow channel;

a first tributary port in fluid connection with said second end of said tributary channel;

a first bridge channel having a first end and a second end, said second end of said first bridge channel in fluid connection with said first end of said first tributary channel, said first end of said first bridge channel in fluid connection with said main flow channel, joining along said bottom of said main flow channel, between said upstream end and said downstream end of said main flow channel; and a second plate sealed to said first surface of said first plate.

2. The device of claim 1 wherein said tributary channel is formed in said first surface of said first plate.

3. The device of claim 2 wherein said bridge channel is formed in said second surface of said first plate and said device comprises a third plate sealed to said second surface of said first plate.

4. The device of claim 2 wherein said second plate is optically transparent.

5. The device of claim 3 wherein said second and third plates are optically transparent.

6. The device of claim 1 wherein said tributary channel lies in said second surface of said first plate.

7. The device of claim 6 wherein said bridge channel cuts through said first plate.

8. The device of claim 1 further comprising a second inlet port in fluid connection with said upstream end of said main flow channel.

9. The device of claim 8 wherein said second inlet port is in fluid connection with said main flow channel between said first inlet port and said bridge channel.

10. The device of claim 8 wherein said second inlet port is in fluid connection with said main flow channel between said bridge channel and said first outlet port.

11. The device of claim 8 further comprising a third inlet port in fluid connection with said main flow channel.

12. The device of claim 11 further comprising a fourth inlet port in fluid connection with said main flow channel.

13. The device of claim 12 further comprising a fifth inlet port in fluid connection with said main flow channel.

14. The device of claim 8 further comprising a second tributary port in fluid connection with said first tributary channel.

15. The device of claim 1 comprising a plurality of tributary channels and a plurality of bridge channels, each of said bridge channels in fluid connection with one of said tributary channels and with said bottom of said main flow channel.

16. The device of claim 1 wherein said main flow channel has a depth between about 100 micrometers and about 1 millimeter.

17. The device of claim 1 wherein said main flow channel has a depth between about 300 micrometers and about 800 micrometers.

18. The device of claim 1 wherein said main flow channel has a width between about 20 micrometers and about 200 micrometers.

19. The device of claim 1 wherein said main flow channel has a width between about 20 micrometers and about 80 micrometers.

20. The device of claim 1 wherein said main flow channel has an aspect ratio small enough to allow diffusion of particles from a second laminar fluid layer into a first laminar fluid layer at a rate which provides a detectable change in property.

21. The device of claim 1 wherein the aspect ratio of said main flow channel is less than one.

22. The device of claim 1 wherein said main flow channel has an aspect ratio of about 1/8.

23. The device of claim 1 wherein said width of said main flow channel changes downstream of said bridge channel.

24. The device of claim 1 wherein said width of said main flow channel increases downstream of said bridge channel.

25. The device of claim 1 wherein said width of said main flow channel decreases downstream of said bridge channel.

26. The device of claim 1 wherein said depth of said main flow channel changes downstream of said bridge channel.

27. The device of claim 1 wherein said depth of said main flow channel increases downstream of said bridge channel.

28. The device of claim 1 wherein said depth of said main flow channel decreases downstream of said bridge channel.

29. The device of claim 1 wherein said first end of said bridge channel is in fluid connection with said bottom of said main flow channel across the entire depth.

30. The device of claim 1 wherein said first end of said bridge channel is in fluid connection with said bottom of said main flow channel along only a portion of the depth.

31. A device for introducing a second laminar fluid layer to, or removing a second laminar fluid layer from, a first laminar fluid layer, said device comprising:

a main flow channel, characterized by a width which is the distance between the channel top and channel bottom, and a depth which is the distance between the channel sides, said width being smaller than said depth, and said main flow channel having an upstream end and a downstream end;

a first inlet port in fluid connection with said upstream end of said main flow channel;

a first outlet port in fluid connection with said downstream end of said main flow channel;

a first tributary channel having a first end and a second end;

a first tributary port in fluid connection with said second end of said tributary channel;

a first bridge channel having a first end and a second end, said second end of said first bridge channel in fluid connection with said first end of said first tributary channel, said first end of said first bridge channel in fluid connection with said bottom of said main flow channel between said upstream end of said main flow channel and said downstream end of said main flow channel.

32. The device of claim 31 wherein said device comprises a first plate having formed therein said main flow channel and said tributary channel.

33. The device of claim 31 wherein said bridge channel comprises tubing.

34. The device of claim 32 wherein said device further comprises a second plate sealed to said first plate.

* * * * *

UNITED STATES PATENT AND TRADEMARK OFFICE

CERTIFICATE OF CORRECTION

PATENT NO. : 6,136,272
DATED : October 24, 2000
INVENTOR(S) : Bernhard Weigl et al.

It is certified that error appears in the above-identified patent and that said Letters Patent is hereby corrected as shown below:

Column 22, lines 59-67 through Column 24, lines 1-62,

Delete Claims 1 – 34 in the issued patent; replace claims 1 – 38 with

1. A device for joining a second laminar fluid layer to, or removing a second laminar fluid layer from, a first laminar fluid layer, said device comprising:

a main flow channel, said main flow channel having an upstream end, a downstream end, a top and a bottom;

a tributary channel having a first end and a second end;

a first inlet port in fluid connection with said upstream end of said main flow channel;

a first outlet port in fluid connection with said downstream end of said main flow channel;

a first tributary port in fluid connection with said second end of said tributary channel; and a first bridge channel having a first end and a second end, said second end of said first bridge channel in fluid connection with said first end of said first tributary channel, said first end of said first bridge channel in fluid connection with said main flow channel, joining along said bottom of said main flow channel, between said upstream end and said downstream end of said main flow channel.

2. The device of claim 1 wherein said main flow channel and said tributary channels are formed in a first surface of a first plate.
3. The device of claim 2 wherein said bridge channel is formed in a second surface of said first plate and said device comprises a second plate sealed to said first surface of said first plate.
4. The device of claim 3 wherein a third plate is sealed to said second surface of said first plate.
5. The device of claim 3 wherein said second plate is optically transparent.
6. The device of claim 3 wherein said second and third plates are optically transparent.
7. The device of claim 1 wherein said tributary channel lies in said second surface of said first plate.
8. The device of claim 7 wherein said bridge channel cuts through said first plate.
9. The device of claim 1 further comprising a second inlet port in fluid connection with said upstream end of said main flow channel.
10. The device of claim 9 wherein said second inlet port is in fluid connection with said main flow channel between said first inlet port and said bridge channel.
11. The device of claim 9 wherein said second inlet port is in fluid connection with said main flow channel between said bridge channel and said first outlet port.
12. The device of claim 9 further comprising a third inlet port in fluid connection with said main flow channel.
13. The device of claim 12 further comprising a fourth inlet port in fluid connection with said main flow channel.
14. The device of claim 13 further comprising a fifth inlet port in fluid connection with said main flow channel.
15. The device of claim 9 further comprising a second tributary port in fluid connection with said first tributary channel.
16. The device of claim 1 comprising a plurality of tributary channels and a plurality of bridge channels, each of said bridge channels in fluid connection with one of the said tributary channels and with said bottom of said main flow channel.
17. The device of claim 1 wherein said main flow channel has a depth between about 100 micrometers and about 1 millimeter.
18. The device of claim 1 wherein said main flow channel has a depth between about 300 micrometers and about 800 micrometers.
19. The device of claim 1 wherein said main flow channel has a width between about 20 micrometers and about 200 micrometers.

UNITED STATES PATENT AND TRADEMARK OFFICE

CERTIFICATE OF CORRECTION

PATENT NO. : 6,136,272 
DATED : October 24, 2000
INVENTOR(S) : Bernhard Weigl et al.

It is certified that error appears in the above-identified patent and that said Letters Patent is hereby corrected as shown below:

20. The device of claim 1 wherein said main flow channel has a width between about 20 micrometers and about 80 micrometers.
21. The device of claim 1 wherein said main flow channel has an aspect ratio small enough to allow diffusion of particles from a second laminar fluid layer into a first laminar fluid layer at a rate which provides a detectable change in property.
22. The device of claim 1 wherein the aspect ratio of said main flow channel is less than one.
23. The device of claim 1 wherein said main flow channel has an aspect ratio of about 1/8.
24. The device of claim 1 wherein said width of said main flow channel changes downstream of said bridge channel.
25. The device of claim 1 wherein said width of said main flow channel increases downstream of said bridge channel.
26. The device of claim 1 wherein said width of said main flow channel decreases downstream of said bridge channel.
27. The device of claim 1 wherein said depth of said main flow channel changes downstream of said bridge channel.
28. The device of claim 1 wherein said depth of said main flow channel increases downstream of said bridge channel.
29. The device of claim 1 wherein said depth of said main flow channel decreases downstream of said bridge channel.
30. The device of claim 1 wherein said first end of said bridge channel is in fluid connection with said bottom of said main flow channel across the entire depth.
31. The device of claim 1 wherein said first end of said bridge channel is in fluid connection with said bottom of said main flow channel along only a portion of the depth.

32. A method of using the device of claim 1, comprising the steps of:
    (a) establishing laminar flow of a first laminar fluid layer containing particles in the main flow channel;
    (b) establishing laminar flow of a second laminar fluid layer containing particles in the tributary channel; and
    (c) joining the first and second laminar fluid layers by allowing the second laminar fluid layer to flow through the bridge channel into the main laminar flow channel.
33. The method of claim 32 further comprising the step of:
    (d) allowing sufficient time for the particles in the first laminar fluid layer of the particles in the second laminar fluid layer to diffuse therebetween.
34. The method of claim 32 wherein the particles in the first laminar fluid layer react with the particles in the second laminar fluid layer.
35. A device for introducing a second laminar fluid layer to, or removing a second laminar fluid layer from, a first laminar fluid layer, said device comprising:

a main flow channel, characterized by a width which is the distance between the channel top and channel bottom, and a depth which is the distance between the channel sides, said width being smaller than said depth, and said main flow channel having an upstream end and a downstream end;

a first inlet port in fluid connection with said upstream end of said main flow channel;

a first outlet port in fluid connection with said downstream end of said main flow channel;

a first tributary channel having a first end and a second end;

a first tributary port in fluid connection with said second end of said tributary channel;

a first bridge channel having a first end and a second end, said second end of said first bridge channel in fluid connection with said first end of said first tributary channel, said first end of said first bridge channel in fluid connection with said bottom of said main flow channel between said upstream end of said main flow channel and said downstream end of said main flow channel.

UNITED STATES PATENT AND TRADEMARK OFFICE

CERTIFICATE OF CORRECTION

PATENT NO. : 6,136,272 
DATED : October 24, 2000
INVENTOR(S) : Bernhard Weigl et al.

It is certified that error appears in the above-identified patent and that said Letters Patent is hereby corrected as shown below:

36. The device of claim 35 wherein said device comprises a first plate having formed therein said main flow channel and said tributary channel.
37. The device of claim 35 wherein said bridge channel comprises tubing.
38. The device of claim 36 wherein said device further comprises a second plate sealed to said first plate.

Signed and Sealed this

Fifteenth Day of July, 2003

JAMES E. ROGAN
*Director of the United States Patent and Trademark Office*